United States Patent
Mariën

(10) Patent No.: US 9,490,700 B2
(45) Date of Patent: Nov. 8, 2016

(54) PORTABLE HANDHELD STRONG AUTHENTICATION TOKEN HAVING PARALLEL-SERIAL BATTERY SWITCHING AND VOLTAGE REGULATING CIRCUIT

(75) Inventor: Dirk Mariën, Wemmel (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 1052 days.

(21) Appl. No.: 13/035,161

(22) Filed: Feb. 25, 2011

(65) Prior Publication Data
US 2012/0217811 A1    Aug. 30, 2012

(51) Int. Cl.
H02J 7/00    (2006.01)
H02M 3/158    (2006.01)
H02M 1/00    (2006.01)

(52) U.S. Cl.
CPC ............. *H02M 3/158* (2013.01); *H02J 7/007* (2013.01); *H02J 7/0063* (2013.01); *H02M 2001/0045* (2013.01); *Y10T 307/653* (2015.04)

(58) Field of Classification Search
CPC ................................ H02J 7/0063; H02J 7/00
USPC .......................................... 307/43, 71, 85–86
See application file for complete search history.

(56) References Cited

U.S. PATENT DOCUMENTS

| | | | |
|---|---|---|---|
| 5,483,433 A | 1/1996 | Yang | |
| 6,100,665 A * | 8/2000 | Alderman | 320/127 |
| 6,140,799 A | 10/2000 | Thomasson | |
| 6,307,350 B1 * | 10/2001 | Alderman | 320/116 |
| 6,430,692 B1 * | 8/2002 | Kimble et al. | 713/300 |
| 6,624,535 B2 * | 9/2003 | Morrow | 307/71 |
| 7,119,518 B1 * | 10/2006 | Dougherty et al. | 320/117 |
| 7,763,993 B2 | 7/2010 | Groff | |
| 2003/0048173 A1 * | 3/2003 | Shigematsu et al. | 340/5.52 |
| 2005/0015636 A1 * | 1/2005 | Chen et al. | 713/323 |
| 2005/0182927 A1 * | 8/2005 | Shatford | 713/159 |
| 2007/0186105 A1 * | 8/2007 | Bailey et al. | 713/168 |
| 2008/0168287 A1 * | 7/2008 | Berry | G06F 1/266 713/323 |
| 2008/0320555 A1 * | 12/2008 | Ciaffi et al. | 726/2 |

(Continued)

FOREIGN PATENT DOCUMENTS

CN    101540505    9/2009

OTHER PUBLICATIONS

International Search Report for PCT/US2012/025011 mailed May 10, 2012.

(Continued)

*Primary Examiner* — Adi Amrany
(74) *Attorney, Agent, or Firm* — RatnerPrestia

(57) ABSTRACT

An electronic power supply circuit for battery-powered hardware devices is disclosed which can be electronically switched to supply any of at least two predetermined voltages wherein the batteries are switched in parallel or in series depending on the desired voltage. Also disclosed is an electronic apparatus comprising the electronic power supply circuit, which in some modes of operation uses the highest of the two predetermined voltages and which in other modes of operation can function with the lower of two predetermined voltages, and includes control logic that switches the electronic power supply circuit to supply said higher voltage when the apparatus in a mode in which it uses this higher voltage and that switches said electronic power supply circuit to supply said lower voltage at least during some of the modes in which the apparatus can function with the lower voltage.

15 Claims, 13 Drawing Sheets

(56) References Cited

U.S. PATENT DOCUMENTS

| | | | |
|---|---|---|---|
| 2009/0089596 A1* | 4/2009 | Ciaffi et al. | 713/300 |
| 2009/0187781 A1* | 7/2009 | Gronemeier | G06F 1/305 713/340 |
| 2010/0011278 A1* | 1/2010 | Bernstein | G06F 11/1008 714/785 |
| 2011/0314539 A1* | 12/2011 | Horton | 726/20 |
| 2012/0025614 A1* | 2/2012 | Taimela et al. | 307/65 |
| 2012/0044011 A1* | 2/2012 | Helle | G06F 1/26 327/392 |
| 2012/0112548 A1* | 5/2012 | Tai | 307/71 |
| 2012/0119582 A1* | 5/2012 | Tajima | 307/71 |

OTHER PUBLICATIONS

International Preliminary Report on Patentability and Written Opinion issued for PCT/US2012/025011 issued Aug. 27, 2013.
Translation of the First Office Action for CN 201210047836.8 issued Mar. 27, 2015.
Chinese Search Report for CN 2012100478368 dated Mar. 16, 2015.

* cited by examiner

PORTABLE HANDHELD STRONG AUTHENTICATION TOKEN HAVING PARALLEL-SERIAL BATTERY SWITCHING AND VOLTAGE REGULATING CIRCUIT

FIELD OF THE INVENTION

The present invention relates to electronic circuits and, more particularly, to power supply circuit for use in electronic devices such as authentication tokens.

BACKGROUND OF THE INVENTION

Strong authentication tokens are a type of small portable handheld dedicated hardware security devices that are well known in the art. They allow service providers and applications to authenticate the possessor of the token, by providing dynamic passwords that could only be generated with knowledge of a secret or key that is shared between the authentication server employed by the service provider or application on the one hand, and the authentication token on the other hand. To generate dynamic passwords or one-time passwords, the strong authentication token applies a cryptographic algorithm to the shared secret and a dynamic variable, for example including one or more of a counter value, a value representing the present time, and a random challenge. Usually the dynamic password can only be used once, thus greatly enhancing the level of security with respect to static passwords. Some strong authentication tokens can also generate electronic signatures on transaction data. Strong authentication tokens are popular, especially to secure applications such as internet banking, because they offer a much higher level of security than static passwords combined with a high user convenience.

To generate dynamic passwords and electronic signatures and to handle data input and output e.g. by means of a keyboard and display, strong authentication tokens include some kind of data processing means such as a microprocessor.

Strong authentication tokens also typically include some non-volatile memory to store data such as configuration data, secrets (including the shared secret for the generation of dynamic passwords), counter values, PIN (personal identification number) values, etc. In many cases this non-volatile memory includes permanently powered RAM (random access memory).

Strong authentication tokens that generate dynamic passwords using a time value typically include a real-time clock.

Some strong authentication tokens have a smart card interface to allow the token device to communicate with a smart card. The smart card may be used to store data that is used for generating dynamic passwords or electronic signatures. The token may also delegate to the smart card a part or whole of the algorithm to generate dynamic passwords or electronic signatures.

To make as wide as possible the field of applicability, strong authentication tokens are designed to be fully autonomous and to not require any connection with other systems such as the user's client computer.

To avoid the need of a digital connection for data transfer between a strong authentication token and a system or application to be secured, strong authentication tokens typically have a display for communicating the generated dynamic credentials such as one-time passwords or electronic signatures to the end user, and a button or keypad to request the generation of a new credential and/or to enter challenges, transaction data, PIN codes, etc. Other known communicating devices for strong authentication tokens may include an auditory output generator.

To avoid the need for an external power supply strong authentication tokens are usually battery powered. To minimize the mechanical complexity of the token and potential hassle for the user these batteries are often not replaceable. In such cases the battery life time is often the limiting factor for the token's life time. Many typical strong authentication tokens require an electrical power supply operating at 5 volts. This supply voltage requirement may stem from usage of an LCD (liquid crystal display) display which for optimal contrast has to be driven at about 5 volts, and/or use of the token to supply electrical power to an inserted smart card which requires a 5 volts supply voltage, and/or use of optical components driven by the token power supply that are used to optically communicate with the token. 3-volt batteries are often used due to their relative low cost and small form factor. A typical strong authentication token therefore includes two 3-volt batteries that are connected in series so as to jointly provide a raw voltage of up to 6 volts which is down-regulated to a stabilised voltage of 5 volts.

For improved portability and ease of logistics (e.g. distribution via mail services) strong authentication tokens are preferably as compact and lightweight as possible. Some strong authentication tokens have the form factor of plastic cards with similar dimensions as credit cards. This considerably limits the size, and hence the capacity, of batteries used in credit card shaped strong authentication tokens.

Strong authentication tokens are meant to be used on a massive scale and hence are subject to a significant cost pressure. To control costs it is preferable that the number and costs of components is minimized.

The discussion of the background to the invention herein is included to explain the context of the invention. This shall not be taken as an admission that any of the material discussed above was published, known or part of the common general knowledge at the priority date of this application.

DISCLOSURE OF THE INVENTION

Technical Problem

As explained above, the life-time of many strong authentication tokens is primarily determined by the life-time of these tokens' batteries. A battery's life-time is in turn mainly determined by on the one hand its capacity and on the other hand its average load i.e. the average power consumption of the electronic circuit powered by the battery. For environmental and cost reasons and the desire the keep the tokens as compact and lightweight as possible, it is desirable not to increase the size (or even to decrease the size if possible)—imposing constraints on the capacity of the batteries powering strong authentication tokens.

What is therefore needed is a cost-effective technique to decrease the average power consumption of the electronic circuitry of battery powered strong authentication tokens and/or to optimally use the electrical energy contained in a token's batteries.

Technical Solution

The present invention is based on the insight by the inventors that the electronic circuitry of many strong authentication tokens requires the full maximum voltage of the power supply only in certain operational modes or phases while in other operational modes or phases the token's circuitry could work with a much lower voltage that can even be less than half of the maximum voltage. Typically the operational phases that require the maximum voltage last much less time than the phases in which much less voltage is required. For example strong authentication tokens that require a 5 volts supply voltage typically do so only to drive an LCD display and/or a smart card requiring 5V. This is typically the case only when the token is actively being used which in turn may be as short as only a couple of minutes per day. If a token is in a phase where it doesn't need to drive a display and/or if the inserted smart card doesn't require 5 Volts (but e.g. 1.8 volts), its electronic circuitry may be powered with a supply voltage that is only half or less of the maximum voltage.

The invention is further based on the insight by the inventors that two batteries in parallel (supplying a voltage Vbatt) will last considerably longer than two batteries in series (together supplying a voltage Vmax=2*Vbatt) when driving the same electronic circuit (assuming the circuit can work with both supply voltages). This is mainly due to the fact that when connected in parallel each of the two batteries has to supply only half of the total current consumed by the circuit. Additionally many circuits will consume a lower total current if the circuit is supplied with a lower voltage.

Typical embodiments of the invention include a DC (direct current) electronic power supply circuit which includes a number of electrical power sources and a configuration sub-circuit which can be configured to connect the electrical power sources in parallel or in series depending on the voltage the power supply circuit is required to supply. In some embodiments the configuration sub-circuit connects all electrical power sources either in parallel or in series. In other embodiments the configuration sub-circuit can also be configured such that the electrical power sources are effectively divided in groups wherein all electrical power sources in each group are connected in series and the groups are in turn connected in parallel. In one embodiment the power supply circuit includes two electrical power sources of the same type and the configuration sub-circuit can be switched to connect the electrical power sources either in parallel or in series. In some embodiments the configuration sub-circuit can, apart from configurably connecting the electrical power sources in parallel or in series, in some operational modes also perform other functions such as regulating or stabilizing a voltage supplied by the power supply circuit.

In what follows the terminology 'one-way conductor' is used to indicate an electronic component or circuit which has two terminals, respectively referred to in this text as the anode and the cathode of the one-way conductor, and which permits current in the direction going from the terminal labelled as the anode to the terminal labelled as the cathode, but which prohibits current flow in the opposite direction, i.e. in the direction going from the terminal labelled as the cathode to the terminal labelled as the anode. Ideally a one-way conductor doesn't allow any current to flow in the direction going from the terminal labelled as the cathode to the terminal labelled as the anode, and there is no voltage drop over the one-way conductor when current flows from the anode to the cathode. As a practical matter, however, a one-way conductor typically has some leakage current from the one-way conductor's cathode to its anode if the one-way conductor is reverse-biased, i.e. if the voltage difference between the cathode and the anode is positive, and there is always a certain voltage drop between the anode and the cathode when current flows through the one-way conductor from anode to cathode. As used herein, a one-way conductor permits and prohibits current flow in accordance with the customary usage of such devices and terms. For example, for a one-way conductor such as a diode (or a pair of transistors coupled together to functions as a diode), current flow is permitted when the diode is forward biased and is prohibited when the diode is reversed biased. Thus, a one-way device may prohibit current flow while still allowing leakage current to flow through the device.

One set of embodiments of the invention include a DC (direct current) power supply circuit which includes a first DC electrical power source, a second DC electrical power source preferably of the same type as the first DC electrical power source, and a configuration sub-circuit which includes a first one-way conductor, a second one-way conductor and an electronic switch that can electronically be opened or closed. The switch connects the positive terminal of the first electrical power source to the negative terminal of the second electrical power source. The switch is adapted such that when it is closed it permits current to flow from the positive terminal of the first electrical power source to the negative terminal of the second electrical power source and when it is open it prohibits current to flow from the positive terminal of the first electrical power source to the negative terminal of the second electrical power source. Ideally when the switch is closed there is no voltage drop over the switch when current flows from the positive terminal of the first electrical power source to the negative terminal of the second electrical power source, and when it is open it doesn't allow any current to flow from the positive terminal of the first electrical power source to the negative terminal of the second electrical power source. As a practical matter, however, there typically will be at least some voltage drop over the switch when it is closed and current flows through it. Also, as a practical matter, when the switch is open some leakage current can typically flow from the positive terminal of the first electrical power source to the negative terminal of the second electrical power source (provided that there is a positive voltage difference between the positive terminal of the first electrical power source and the negative terminal of the second electrical power source) but this leakage current is typically much smaller than the average current flowing through any of the electrical power sources the switch is connected to. As used herein, a switch permits and prohibits current flow in accordance with the customary usage of such devices and terms. For example, for a switch such as a transistor current flow is permitted between the emitter/source and the collector/drain when an appropriate current/voltage is present at the base/gate of the transistor and is prohibited this current/voltage is removed. Thus, a switch may prohibit current flow while still allowing leakage current to flow through the device. In one embodiment the electronic switch includes a PNP transistor. The first one-way conductor connects the positive terminals of both electrical power sources such that it permits current to flow in the direction going from the positive terminal of the first electrical power source to the positive terminal of the second electrical power source and it prohibits current to flow in the opposite direction. Using the terminology defined above this means that the anode of the first one-way conductor is connected to the positive terminal of the first electrical power source and its cathode is connected to the positive terminal of the second electrical power source. The second one-way conductor connects the negative terminals of both electrical power sources such that it permits current to flow in the direction going from the negative terminal of the first electrical power source to the negative terminal of the second electrical power source and it prohibits current to flow in the opposite direction. Using the terminology defined above this means that the anode of the second one-way conductor is connected to the negative terminal of the first electrical power source and its cathode is connected to the negative terminal of the second electrical power source. The node of the circuit where the first one-way conductor and the positive terminal of the second electrical power source are connected constitutes the positive terminal of the power supply circuit. The node of the circuit where the second one-way conductor and the negative terminal of the first electrical power source are connected constitutes the negative terminal of the power supply circuit.

In an exemplary embodiment, if the switch is open the entire circuit is equivalent to a circuit including two branches in parallel, the first branch consisting of the first electrical power source and the first one-way conductor connected in series and the second branch consisting of the second one-way conductor and the second electrical power source connected in series.

In some embodiments the electrical power sources are voltage sources. In that case the first branch acts as a voltage source supplying a voltage which is equal to the voltage supplied by the first voltage source minus the voltage drop in the first one-way conductor. The second branch acts as a voltage source supplying a voltage which is equal to the voltage supplied by the second voltage source minus the voltage drop in the second one-way conductor. The entire circuit acts as a voltage source which supplies a voltage which is the maximum of the voltage supplied by the first branch and the voltage supplied by the second branch.

If the switch is closed the entire circuit is equivalent to the series connection of the first electrical power source, the switch and the second electrical power source.

In some embodiments the electrical power sources are voltage sources. If the switch is closed the entire circuit is equivalent to the series connection of the first voltage source, the switch and the second voltage source (with no current flowing through the first and second one-way conductors). The entire circuit acts as a voltage source which supplies a voltage which is the sum of the voltages of the first and the second voltage source minus the voltage drop over the switch.

Another set of embodiments of the invention include a DC power supply circuit which includes N branches (N being an integer number larger than 2), each branch including a series connection of a first one-way conductor, an electrical power source and a second one-way conductor. The circuit furthermore includes N–1 switches. The first one-way conductor of each branch connects the circuit's node that represents the circuit's negative terminal to the negative terminal of that branch's electrical power source such that current can flow from the circuit's node that represents the circuit's negative terminal with the negative terminal of that branch's electrical power source but that current is prohibited from flowing in the opposite direction. Using the terminology defined above this means that the anode of the first one-way conductor of each branch is connected to the circuit's node that represents the circuit's negative terminal and that its cathode is connected to the negative terminal of that branch's electrical power source. The second one-way conductor of each branch connects the positive terminal of that branch's electrical power source to the circuit's node that represents the circuit's positive terminal such that current can flow from the positive terminal of that branch's electrical power source to the circuit's node that represents the circuit's positive terminal but that current is prohibited from flowing in the opposite direction. Using the terminology defined above this means that the anode of the second one-way conductor of each branch is connected to the positive terminal of that branch's electrical power source and that its cathode is connected to the circuit's node that represents the circuit's positive terminal. Each branch is connected to the next branch by means of a switch which connects the positive terminal of that branch's electrical power source with the negative terminal of the next branch's electrical power source.

In some embodiments the first branch's one-way conductor which connects the circuit's node that represents the circuit's negative terminal to the negative terminal of that branch's electrical power source, may be replaced by a two-way conductor which in some embodiments may include an ordinary conducting connecting element such as a conducting wire.

In some embodiments the last branch's one-way conductor which connects the positive terminal of that branch's electrical power source to the circuit's node that represents the circuit's positive terminal may be replaced by a two-way conductor which in some embodiments may include an ordinary conducting connecting element such as a conducting wire.

In some typical embodiments the circuit's electrical power sources are voltage sources.

If all switches are closed then the circuit is equivalent to a series of N voltage sources and N–1 switches which supplies a voltage equal to the sum of the voltages supplied by the N voltage sources minus the sum of the voltage drops over the N–1 switches.

If all switches are open then the circuit is equivalent to a circuit including N branches in parallel, each branch including a series connection of a first one-way conductor, a voltage source and a second one-way conductor. Each branch acts as a voltage source supplying a voltage which is equal to the voltage supplied by that branch's voltage source minus the voltage drops over that branch's first and second one-way conductors. The entire circuit acts as a voltage source which supplies a voltage which is the maximum of the voltages supplied by any of the branches.

By judiciously closing some switches and opening other switches, the circuit can be made to supply different voltages that lie between the maximum voltage that is reached when all switches are closed and the minimum voltage that is reached when all switches are opened. In that case the branches are effectively divided in a number of groups of consecutive branches wherein the groups are each defined so that if two branches are connected by a closed switch then by definition they are in the same group and if two branches are connected by an open group then by definition they are in a different group. The sub-circuit of each group effectively includes a series circuit of voltage sources and the closed switches connecting them, and is equivalent to a voltage source supplying a voltage equal to the sum of the voltages supplied by the voltage sources in the group minus the sum of voltage drops of the closed switches in the group that connect the group's voltage sources minus the voltage drops over two one-way conductors (i.e. the one way conductor that connects the node representing the negative terminal of the entire circuit to the negative terminal of the group's first voltage source and the one way conductor that connects the positive terminal of the group's last voltage source to the node representing the positive terminal of the entire circuit). The voltage supplied by the entire circuit is the highest voltage supplied by any of the groups.

In one embodiment the voltage sources are chosen such that they have (approximately) the same current-voltage characteristics, and also the one-way conductors are chosen such that they have (approximately) the same current-voltage characteristics, as are the switches. In that case, if the switches are closed or opened such that all resulting groups contain the same number of voltage sources (i.e. the number of voltage sources per group is chosen to be a divider of the total number of voltage sources in the entire circuit), then each group supplies the same voltage and an even load balancing between the groups will be reached. Since the voltage sources in each group are connected in series, an even load balancing for all individual voltage sources is also obtained that way. The number of different voltages the entire circuit can supply while having an even load balancing of all individual voltage sources depends on the factorization of the total number N of the voltage sources in the circuit.

In some embodiments the electrical power sources are voltage sources and one or more of the voltage sources include a battery. In other embodiments one or more of the voltage sources may include other sources of electrical energy such as photovoltaic cells, charged capacitors or fuel cells. In some embodiments one or more of the voltage sources may include a circuit that is equivalent to a voltage source. For example they may include the series connection of a battery and a resistor, or the series connection of a battery and a diode (with the diode's anode connected to the battery's positive pole or the diode's cathode connected to the battery's negative pole), or the parallel connection of a battery and a diode (with the diode's anode connected to the battery's negative pole and the diode's cathode connected to the battery's positive pole).

In some typical embodiments one or more of the one-way conductors may include a diode. In other embodiments one or more of the one-way conductors may include other components such as a bipolar junction transistor the base of which is connected to the collector. In some embodiments one or more of the one-way conductors may include a circuit with two terminals that conducts current in one direction only. Examples of such a circuit include the series connection of a diode and resistor, the series connection of two diodes, the series connection of two transistors the bases of which are connected to the collectors, the series connection of a diode and a bipolar junction transistor the base of which is connected to the collector, the series connection of two one-way conductors, the parallel connection of two diodes, the parallel connection of two one-way conductors, etc.

In some embodiments one or more of the switches include a transistor. In some specific embodiments one or more of the switches include an PNP bipolar junction transistor the emitter of which is connected to the positive terminal of the first voltage source, the collector connected to the negative terminal of the second voltage source, the base used to electronically open or close the switch (e.g. by applying a high respectively low voltage to the base).

In some typical embodiments the circuit includes a set of discrete components (e.g. batteries, diodes, transistors, etc.) mounted on a printed circuit board, the discrete components connected by conductive tracks on the circuit board. In other embodiments some components may be connected by conductive wires.

In another embodiment of the invention the electrical power sources are voltage sources and the switches can be gradually opened to conduct more or less current. By judiciously making the degree of conductivity of the open switches dependent on the resulting voltage of the entire circuit (or, put differently, by judiciously varying the voltage drop over the switches), the switches can effectively be used to regulate the voltage that the circuit supplies. In some embodiments the circuit contains extra components which act as a regulating circuit which compares the output voltage of the entire circuit with some reference voltage and which drives the switches to conduct more current if the output voltage is too low and less current if the output current is too high with regards to the reference voltage. More details are provided in the discussion of the drawings below.

Other aspects of the invention include an electronic device that is powered by or includes one of the power supplying circuits described above. In some embodiments the electronic device opens and closes the applicable switches in function of the desired supply voltage. In some embodiments the electronic device includes one or more components adapted to determine which supply voltage is required or desired, one or more components to determine which switches should be opened and closed to obtain the required or desired supply voltage, and one or more components to open or close the switches accordingly. In some embodiments these one or more components may include a microprocessor, or a microcontroller, or an FPGA (Field-programmable Gate Array), or an ASIC (application-specific integrated circuit).

In still another set of embodiments one of the power supplying circuits described above that is capable of supplying more than one voltage is being switched at a more or less regular rate with a relatively high frequency between supplying one voltage (e.g. a high voltage) and another voltage (e.g. a low voltage). Switching the supply voltages results in an average supply voltage the value of which is somewhere between the two voltages supplied by the power supplying circuit. By judiciously choosing the relative fraction of time that the power supplying circuit supplies one voltage with respect to the fraction of time that the power supplying circuit supplies the other voltage, the average voltage can be chosen to have any voltage between the two voltages that the power supply circuit supplies. In principle the average supply voltage can thus be given any voltage in the range between the two voltages supplied by the power supplying circuit. In a typical embodiment the relative fraction of time that the power supplying circuit supplies one voltage with respect to the fraction of time that the power supplying circuit supplies the other voltage is chosen as a function of the targeted average supply voltage. The actual voltage supplied will then vary with time and consists of an AC (alternative current) ripple on top of a DC component. In some specific embodiments a low-pass filter is added to the power-supplying circuit to reduce the amplitude of the AC ripple.

In some embodiments the electronic device includes a strong authentication token. In some embodiments the strong authentication token includes components that require a certain minimum high voltage at least during certain operational modes. In some embodiments this high voltage may be about 5 volts. These components may include an LCD display, or a smart card interface which is capable of interfacing with 5V cards, or optical components for optical transmission of data. In some embodiments the strong authentication token includes one or more components which can be powered both at a high and a lower voltage wherein the lower voltage may be as low as roughly half of the high voltage. In some embodiments this lower voltage may be about 2.6 volts. In some embodiments these components may include components that require electrical power continuously or during a significant fraction of the useful life of the strong authentication token. In one embodiment these components may include components that are adapted to function as a real-time clock. In another embodiment these components include a memory that functions as a non-volatile memory for storing data which may include configuration parameters, cryptographic secrets, PIN values, counter values or other values that should be stored across multiple usages of the strong authentication token. In some embodiments the strong authentication token includes components that are adapted to determine in function of the operational mode whether the high voltage is required or whether the token can operate with the lower voltage and which voltage is preferred at any time, to determine which switches should be opened and closed to obtain the preferred supply voltage, and to open and close the appropriate switches accordingly. In one embodiment the strong authentication token includes an LCD display requiring 5V for optimal visibility and a RAM memory containing cryptographic secrets and a PIN value that must be retained throughout the useful life-time of the token. The RAM memory may be powered at any voltage between 2.5 volts and 5 volts. The token furthermore includes a power supply circuit including two 3V batteries, two diodes and a PNP transistor switch connected as explained above. The PNP transistor is connected to a voltage regulating circuit which when activated drives the transistor such that the power supply circuit supplies 5V and which when deactivated closes the switch such that the power supply circuit supplies 3 volts minus the voltage drop over the diodes. In one embodiment the power consumption in the low voltage modes is such that the voltage drop over the diodes is about 0.4 volts such that the resulting supply voltage is about 2.6 volts. The token also includes a microprocessor which is connected to the voltage regulating circuit to turn it on or off and which is further adapted to determine when the supply voltage should be 5 volts or when 2.6 volts is preferred and to turn the voltage regulating circuit on or off accordingly.

In accordance with other aspects of the invention, a method is provided to handle the power management of an electronic device that includes an electronic power supply circuit capable of being switched to supply at least two different supply voltages, a high supply voltage and a lower supply voltage. In one embodiment the electronic device has at least two different modes of operation where some modes of operation utilize the high supply voltage and other modes of operation can utilize both supply voltages but consumes less electrical power when powered by the lower voltage than when powered by the high voltage. In a typical embodiment the method includes the following steps:

determining whether the high voltage is required or whether the electronic device can operate with the lower voltage, choosing which supply voltage is preferred, and switching the electronic power supply circuit to supply the preferred supply voltage.

In some embodiments the electronic device can be in different operational modes whereby in some modes the high voltage may be required and in other modes the high voltage is not required and the step of determining whether the high voltage is required or whether the electronic device can operate with the lower voltage includes taking into account which mode the device is in.

In some embodiments the electronic device includes a set of components which when activated require the high voltage and the step of determining whether the high voltage is required or whether the electronic device can operate with the lower voltage includes determining for a particular operational mode whether at least one of these components will be activated in that mode.

In other embodiments the step of choosing which supply voltage is preferred includes choosing the high voltage in operational modes where the high voltage is required and choosing the lower voltage in at least some operational modes where the high voltage is not required. In some embodiments the step of choosing which supply voltage is preferred includes choosing the lower voltage in operational modes where the high voltage is not required.

In still other embodiments the electronic power supply circuit includes a number of electrical power sources and a configuration sub-circuit that includes switches and that can switch at least some of the electrical power sources in parallel or in series, and the step of switching the electronic power supply circuit to supply the preferred supply voltage includes appropriately configuring switches of the configuration sub-circuit in function of the required supply voltage.

In some embodiments the electronic device includes a strong authentication token that includes a display that requires the high voltage for optimal readability and that has at least one operational mode in which optimal readability of the display is required.

In some embodiments the electronic device includes a strong authentication token that includes a smart card reader that requires the high voltage when driving a smart card and that has at least one operational mode in which a smart card is present and must be driven.

Although the invention has so far been described primarily in the context of strong authentication tokens, it will be clear to a person skilled in the art that it can also be used in other devices that use an electrical power supply where it would be advantageous to be able to electronically switch between two or more voltages and where it is advantageous to efficiently use the electrical power sources that are included in the devices' electrical power supply.

Advantageous Effects

An important advantage of the present invention is that at a minimal extra cost of only a few simple components a power supply including more than one battery (or other types of voltage sources) can be electronically switched between supplying a certain maximum voltage and one or more lower voltages that are (more or less) a multiple of the voltage that a single battery (or other type of voltage source) can supply.

An electronic device including a power supply embodying the invention with two batteries of the same type can thus switch between a high voltage when its electronic circuit needs the high voltage and a lower voltage which is approximately half of that high voltage when it can operate with that lower voltage, thus lowering the overall power consumption with respect to when both batteries would permanently be connected in series.

A strong authentication token which includes a power supply embodying the invention with two batteries and which is further adapted to switch between the high voltage when that high voltage is required and the lower voltage otherwise, can thus, by lowering its overall power consumption, significantly prolong its life-time expectation.

More advantages of the present invention will be apparent to a person skilled in the art.

BRIEF DESCRIPTION OF THE DRAWINGS

The foregoing and other features and advantages of the invention will be apparent from the following, more particular description of several embodiments of the invention, as illustrated in the accompanying drawings.

DETAILED DESCRIPTION

Figure 1:
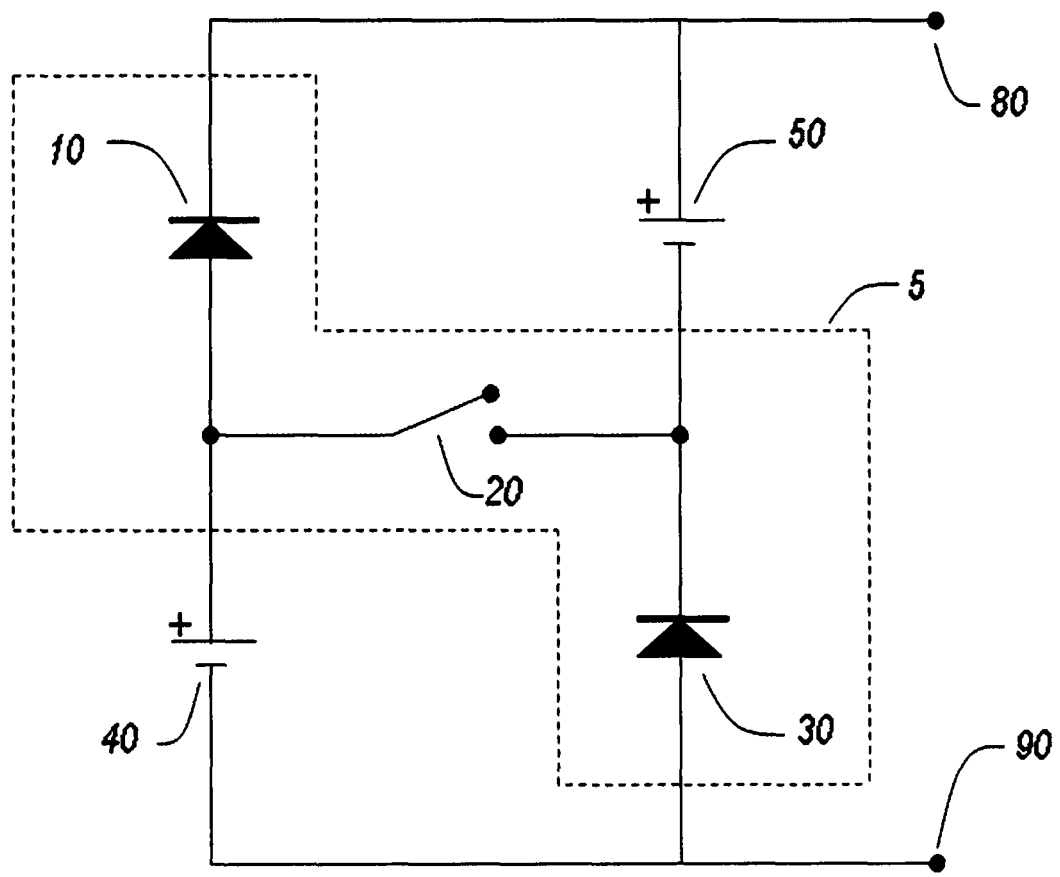
FIG. 1 illustrates an electronic circuit according to one embodiment of the invention.

FIG. 1 illustrates a power supply circuit according to one embodiment of the invention including two electrical power sources (40 & 50) and a configuration sub-circuit (5) which in an exemplary embodiment includes two one-way conductors (10 & 30) and a switch (20). The negative pole of the first electrical power source (40) is connected to the negative pole (90) of the circuit. The positive pole of the second electrical power source (50) is connected to the negative pole (80) of the circuit. The switch (20) connects the positive pole of the first electrical power source (40) to the negative pole of the second electrical power source (50). The first one-way conductor (10) connects the positive poles of the two electrical power sources (40 & 50). The second one-way conductor (30) connects the negative poles of the two electrical power sources (40 & 50). The one-way conductors (10 & 30) are adapted such that they (ideally) conduct electrical current in one direction only. The first one-way conductor (10) allows current to flow from the positive pole of the first electrical power source (40) to the positive node (80) of the circuit and prevents any significant amount of current to flow in the opposite direction, at least when the switch (20) is closed. The second one-way conductor (30) allows current to flow from the negative node (90) of the circuit to the negative pole of the second electrical power source (50) and prevents any significant amount of current to flow in the opposite direction, at least when the switch (20) is closed. The switch (20) is adapted so that when it is closed it allows current to flow from the positive pole of the first electrical power source (40) to the negative pole of the second electrical power source (50), and when it is opened it prevents any significant amount of current to flow from the positive pole of the first electrical power source (40) to the negative pole of the second electrical power source (50).

When the switch (20) is closed the circuit is equivalent to the series connection of the first (40) and second (50) electrical power sources (at least to the extent that the switch (20) and the one-way conductors (10 & 30) can be considered as respectively an ideal switch and ideal one-way conductors). When the switch (20) is opened the circuit is equivalent to the parallel connection of the first (40) and second (50) electrical power sources (at least to the extent that the switch (20) and the one-way conductors (10 & 30) can be considered as respectively an ideal switch and ideal one-way conductors).

In one embodiment the electrical power sources (40 & 50) may include a voltage source, for example a battery, a photovoltaic voltage source, a fuel cell, a charged capacitor or some other type of DC (direct current) voltage source. In another embodiment the electrical power sources (40 & 50) may include a current source. In one embodiment the one-way conductors (40 & 50) may include a diode.

In another embodiment the electrical power sources (40 & 50) both include a voltage source (for example a battery) and deliver the same voltage, the one-way conductors (10 & 30) each include a diode with the same (or at least similar) voltage characteristics, wherein the anode of the first diode (10) is connected to the positive pole of the first voltage source (40) and its cathode is connected to the positive pole (80) of the circuit, and wherein the anode of the second diode (30) is connected to the negative pole (80) of the circuit and its cathode is connected to the negative pole of the second voltage source (50). In that case, if the switch (20) is closed, then the circuit supplies a voltage that is equal to twice the voltage delivered by each voltage source minus the voltage drop in the switch (20). If the switch (20) is opened then the circuit is equivalent to the parallel connection of two times a voltage source and a diode in series and it supplies a voltage that is equal to the voltage supplied by one voltage source minus the voltage drop in one diode. The load current of the circuit is balanced between both voltage sources.

Figure 2:
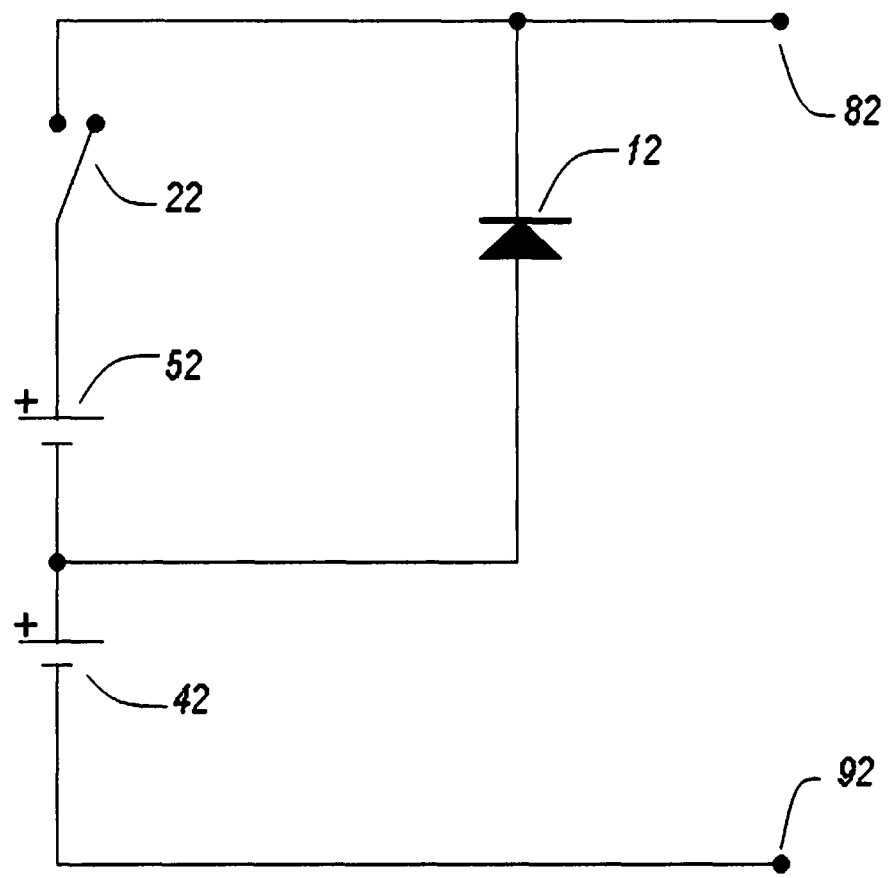
FIG. 2 illustrates an electronic circuit which represents an alternative to the circuit of FIG. 1.

FIG. 2 illustrates an alternative power supply circuit illustrating the advantages of the circuit of FIG. 1 including two electrical power sources (42 & 52), a one-way conductor (12) and a switch (22). The negative pole of the first electrical power source (42) is connected to the negative pole (92) of the circuit. The positive pole of the first electrical power source (42) is connected to the negative pole of the second electrical power source (52). The switch (20) connects the positive pole of the second electrical power source (52) to the positive pole (82) of the circuit. The one-way conductor (12) connects the positive pole of the first electrical power source (42) to the positive pole (82) of the circuit. The one-way conductor (12) allows current to flow from the positive pole of the first electrical power source (42) to the positive node (82) of the circuit and prevents any significant amount of current to flow in the opposite direction.

When the switch (22) is closed the circuit is equivalent to the series connection of the first (42) and second (52) electrical power sources. In that case the circuit of FIG. 2 supplies a voltage which is equal to the sum of the voltages supplied by the first and second voltage sources minus the voltage drop over the switch (22). When the switch (22) is opened the circuit is equivalent to the series connection of the first electrical power source (42) and the one-way conductor (12). In that case the circuit of FIG. 2 supplies the voltage supplied by the first voltage source (42) minus the voltage drop over the one-way conductor (12).

The circuits illustrated in FIGS. 1 and 2 can both be switched to supply one of two voltages and they can supply the same voltages. The circuit of FIG. 2 has the advantage that it requires one component (a one-way conductor) less than the circuit of FIG. 2. However the circuit of FIG. 1 has the distinct advantage that when the switch (20) is opened (to supply the lower of the two voltages it can supply) the load current is balanced over both voltage sources (40 & 50). In contrast, if the switch (12) of the circuit of FIG. 2 is opened (to supply the lower of the two voltages it can supply), the load current has to be fully supplied by the first voltage source (42). Hence the circuit of FIG. 1 (which is according to an embodiment of the invention) uses the electrical power of the two electrical power sources more efficiently than the circuit of FIG. 2 (which is not according to the invention).

Figure 3:
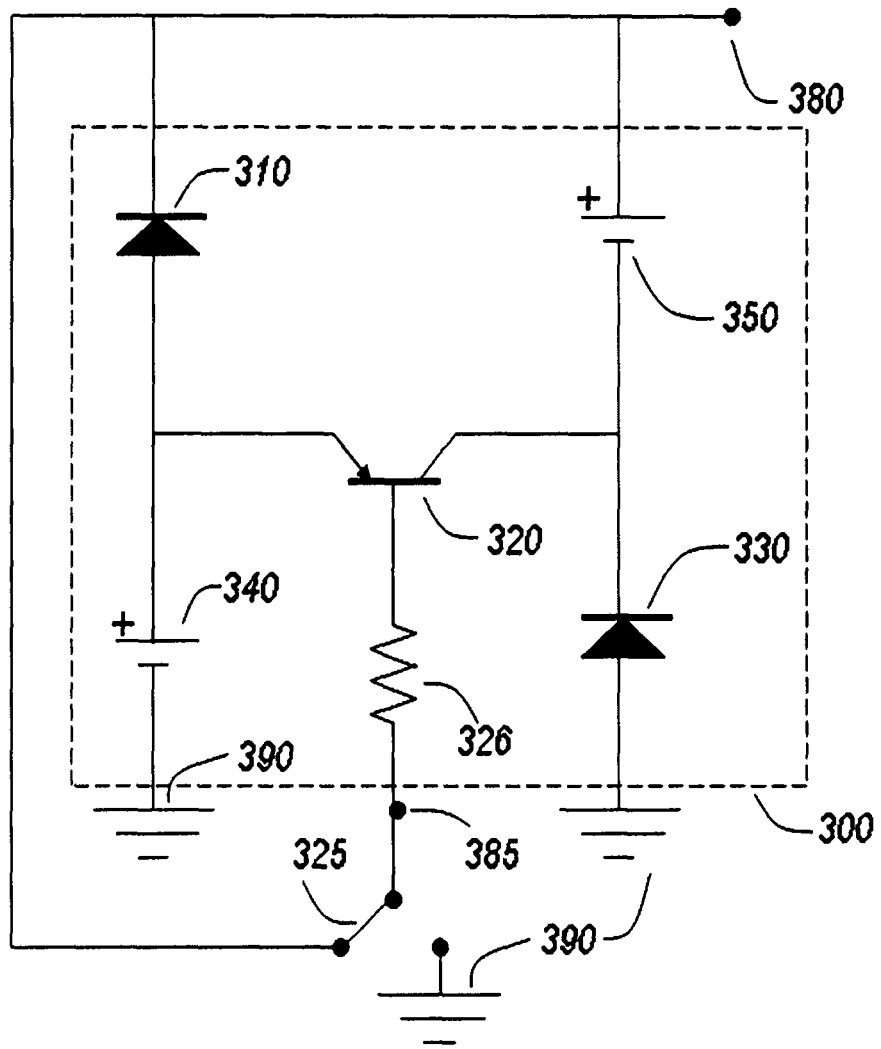
FIG. 3 illustrates an electronic circuit according to another embodiment of the invention.

FIG. 3 illustrates an electronic circuit according to another embodiment of the invention including a switch (325) and a power-supplying sub-circuit (300) which in turn includes two batteries (340 & 350), two diodes (310 & 330), a PNP bipolar junction transistor (320) and a resistor (326). The negative terminal of the first battery (340) is connected to the negative terminal (390) of the circuit (which is also the negative terminal of sub-circuit (300) and which in the illustrated example coincides with the ground). The positive terminal of the first battery (340) is connected to the anode of the first diode (310). The cathode of the first diode (310) is connected to the positive terminal (380) of the circuit (which is also the positive terminal of sub-circuit (300)). The positive terminal of the second battery (350) is connected to the positive terminal (380) of the circuit. The negative terminal of the second battery (350) is connected to the cathode of the second diode (330). The anode of the second diode (330) is connected to the negative terminal (390) of the circuit. The positive terminal of the first battery (340) is furthermore connected to the emitter of the PNP transistor (320). The collector of the transistor (320) is connected to the negative terminal of the second battery (350). The base of the transistor (320) is connected to one terminal of the resistor (326). The other terminal of resistor (326) acts as a control terminal (385) of sub-circuit (300). The switch (325) can connect the control terminal (385) of sub-circuit (300) (i.e. the resistor (326)) to either the positive terminal (380) of the circuit or the negative terminal (390) of the circuit.

Sub-circuit (300) is a power supplying circuit that can supply electrical power through its positive (380) and negative (390) terminals, and of which the voltage that it supplies can be controlled through control terminal (385) as follows. If the switch (325) connects the resistor (326) to the negative terminal (390) of the circuit, the transistor (320) will act as a closed switch and the circuit is equivalent to the circuit of FIG. 1 with the switch (20) in the closed state. If the switch (325) connects the resistor (326) to the positive terminal (390) of the circuit, the transistor (320) will act as an open switch and the circuit is equivalent to the circuit of FIG. 1 with the switch (20) in the open state. In one embodiment the switch (325) may be included in decision logic that is adapted to decide whether the circuit should supply the higher or the lower supply voltage.

Figure 4:
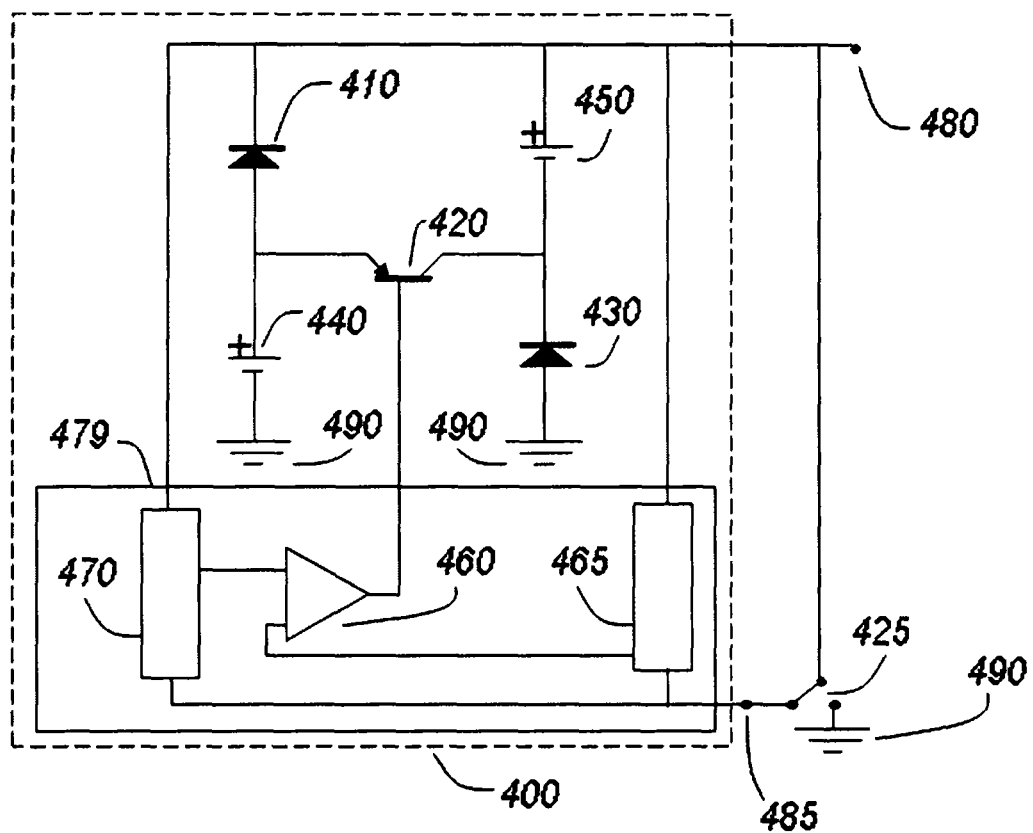
FIG. 4 illustrates an electronic circuit according to yet another embodiment of the invention.

FIG. 4 illustrates an electronic circuit according to yet another embodiment of the invention. It includes a switch (425) and a power-supplying sub-circuit (400). The sub-circuit (400) includes two batteries (440 & 450), two diodes (410 & 430), a PNP bipolar junction transistor (420) and a switch (425). The negative terminal of the first battery (440) is connected to the negative terminal (490) of the circuit (which is also the negative terminal of the sub-circuit (400) and which in the illustrated example coincides with the ground). The positive terminal of the first battery (440) is connected to the anode of the first diode (410). The cathode of the first diode (410) is connected to the positive terminal (480) of the circuit (which is also the positive terminal of the sub-circuit (400)). The positive terminal of the second battery (450) is connected to the positive terminal (480) of the circuit. The negative terminal of the second battery (450) is connected to the cathode of the second diode (430). The anode of the second diode (430) is connected to the negative terminal (490) of the circuit. The positive terminal of the first battery (440) is furthermore connected to the emitter of the PNP transistor (420). The collector of the transistor (420) is connected to the negative terminal of the second battery (450).

The sub-circuit (400) furthermore includes a voltage regulating sub-circuit (479). It may have a terminal that is connected to the positive terminal (480) of the circuit. Another terminal (485) of the voltage regulating sub-circuit (479) is connected to the switch (425) which can connect it to the positive terminal (480) or the negative terminal (490) of the circuit. Yet another terminal of the voltage regulating sub-circuit (479) is connected to the base of the PNP transistor (420) to steer the latter's conductivity.

The voltage regulating sub-circuit (479) is adapted to ensure the following behaviour. If the switch (425) connects the control terminal (485) of the voltage regulating sub-circuit (479) to the positive terminal (480) then the voltage regulating sub-circuit (479) is not activated. In that case the PNP transistor (420) will not be in a conductive state and will effectively act as an open switch. The full circuit then supplies a voltage that is equal to the voltage of one battery minus the voltage drop over a diode and the load is balanced over both batteries (to the extent that both batteries and both diodes have the same voltage-current characteristics).

If the switch (425) connects the control terminal (485) of the voltage regulating sub-circuit (479) to the negative terminal (490) then the voltage regulating sub-circuit (479) is activated. In that case it will regulate the conductivity of the transistor (420) and hence the voltage drop over the transistor (420). By doing so it can regulate the voltage that the complete circuit supplies to be between a minimal value which is equal to the voltage supplied by one battery minus the voltage drop over a diode (when the transistor (420) is steered to be not conductive at all) and a maximum value which is equal to the sum of the voltages supplied by both batteries minus the voltage drop over the transistor (420) in maximum conductivity (when the transistor (420) is steered to be maximally conductive).

In one embodiment the voltage regulating sub-circuit (479) is adapted to stabilize (when it is activated) the voltage supplied by the complete circuit to a specific value.

In one embodiment, the voltage regulating sub-circuit (479) includes a reference sub-circuit (470), a comparator sub-circuit (460) and a feedback sub-circuit (465). When the voltage regulating sub-circuit (479) is activated (i.e. when the switch (425) connects to the circuit's negative terminal (490)), the reference sub-circuit (470) provides a relatively stable reference voltage, the feedback sub-circuit (465) provides a feedback voltage which is an indication of the voltage supplied by the circuit, and the comparator (460) compares the reference voltage provided by the reference sub-circuit (470) to the voltage provided by the feedback sub-circuit (465). If the feedback voltage is lower than the reference voltage, then the comparator (460) will drive the transistor (420) so as to increase the latter's conductivity which will cause the voltage supplied by the circuit, and hence the feedback voltage, to increase. If the feedback voltage is higher than the reference voltage, then the comparator (460) will drive the transistor (420) so as to reduce the latter's conductivity which will cause the voltage supplied by the circuit, and hence the feedback voltage, to decrease.

In one embodiment the switch (425) may be included in decision logic that is adapted to decide whether the circuit should supply the higher or the lower supply voltage.

Figure 5:
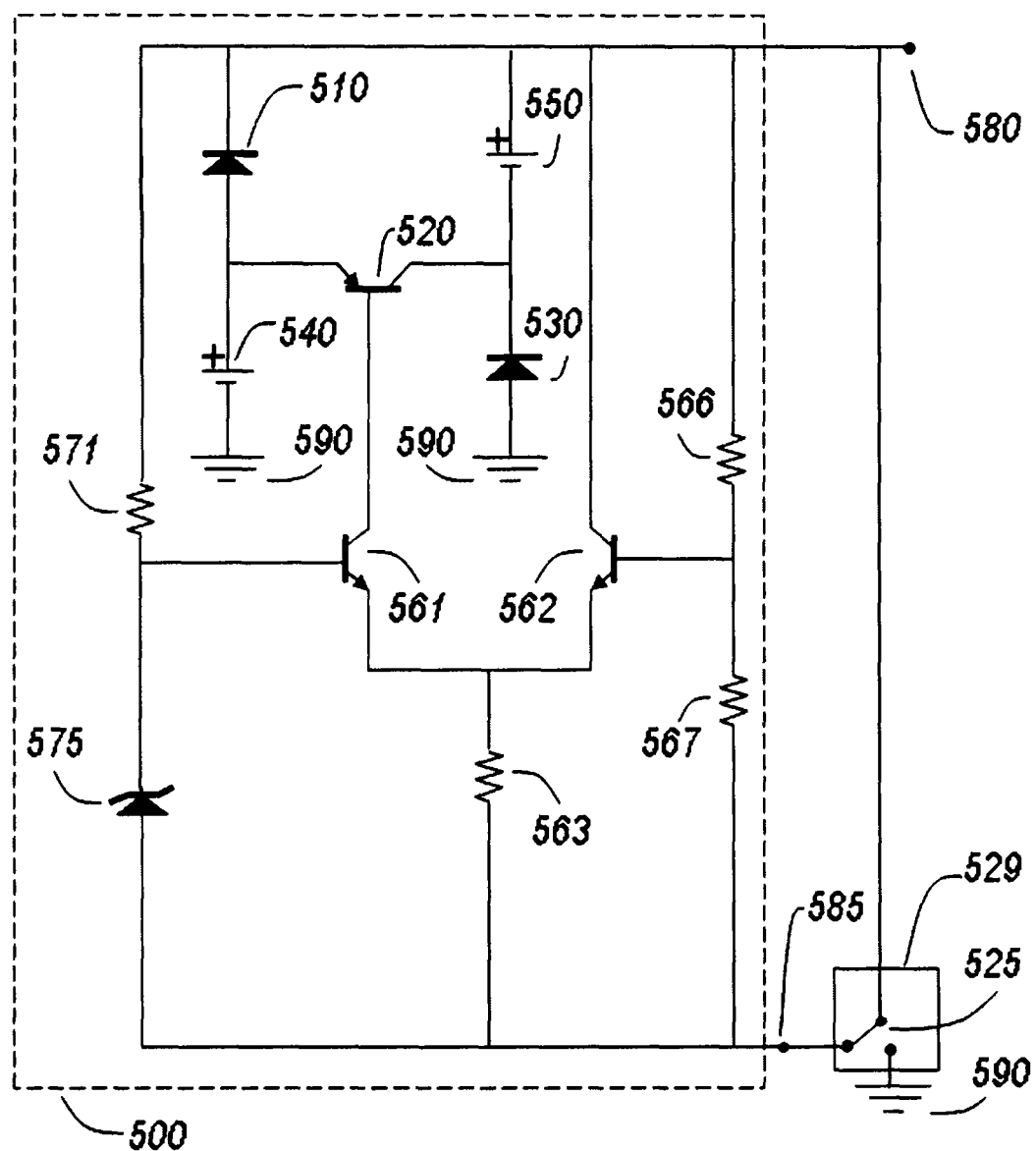
FIG. 5 illustrates an electronic circuit according to still another embodiment of the invention.

FIG. 5 illustrates an electronic circuit according to still another embodiment of the invention. It includes a switch (525) and a voltage supplying sub-circuit (500) which includes two batteries (540 & 550), two diodes (510 & 530) and a PNP bipolar junction transistor (520) which are connected in the same way as the corresponding components of the circuit of FIG. 4.

The sub-circuit (500) of FIG. 5 furthermore includes four resistors (571, 563, 566 & 567), a Zener diode (575) and two transistors (561 & 562). One terminal of the first resistor (571) is connected to the circuit's positive terminal (580). The other terminal of the first resistor (571) is connected to the base of the first transistor (561). The cathode of the Zener diode (575) is also connected to the base of the first transistor (561). The anode of the Zener diode (575) is connected to the control terminal (585) of the sub-circuit (500). The collector of the first transistor (561) is connected to the base of PNP transistor (520). The emitter of the first transistor (561) is connected to one terminal of the resistor (563). The other terminal of the resistor (563) is connected to the control terminal (585) of the sub-circuit (500). The collector of the second transistor (562) is connected to the positive terminal (580) of the circuit. The emitter of the second transistor (562) is connected to the emitter of the first transistor (561) (and hence to the resistor (563)). One terminal of the resistor (566) is connected to the positive terminal (580) of the circuit. The other terminal of the resistor (566) is connected to the base of the second transistor (562). One terminal of the resistor (567) is also connected to the base of the second transistor (562). The other terminal of the resistor (567) is connected to the control terminal (585) of the sub-circuit (500). The control terminal (585) of the sub-circuit (500) is connected to the switch (525) which can connect it to the positive terminal (580) or the negative terminal (590) of the circuit.

When the switch (525) connects the Zener diode (575) and the resistors (563) and (567) to the circuit's negative terminal (590), then the resistor (571) and the Zener diode (575) act as a voltage reference sub-circuit, the two transistors (561) and (562) and the resistor (563) together act as a comparator sub-circuit, and the two resistors (566) and (567) together act as a feedback sub-circuit. The voltage over the Zener diode (575) is the reference voltage which is applied to the base of the first transistor (561). The voltage over the resistor (567) is the feedback voltage and is proportional to the voltage between the positive terminal (580) and the negative terminal (590) of the circuit. This feedback voltage is applied to the base of the second transistor (562). When the feedback voltage is higher than the reference voltage then the first transistor (561) will drive the PNP transistor (520) to be less conductive which causes a higher voltage drop over the PNP transistor (520) which in turn causes a lower voltage between the positive terminal (580) and the negative terminal (590) of the circuit and hence a proportionally lower feedback voltage at the base of the second transistor (562). Vice versa, when the feedback voltage is lower than the reference voltage then the first transistor (561) will drive the PNP transistor (520) to be more conductive which causes a lower voltage drop over the PNP transistor (520) which in turn causes a higher voltage between the positive terminal (580) and the negative terminal (590) of the circuit and hence a proportionally higher feedback voltage at the base of the second transistor (562). In other words the voltage supplied by the circuit will be stabilised around a voltage which is proportional to the reference voltage supplied by the Zener diode (575). In one embodiment the voltage supplied by the circuit when the switch (525) connects the Zener diode (575) and the resistors (563) and (567) to the circuit's negative terminal (590) is regulated to a value that is lower than the sum of the voltages of the two batteries (540) and (550), but higher than the voltage supplied when the PNP transistor (520) is completely turned off. In one embodiment the two batteries supply a voltage of about 3 volts and the components of the circuit are judiciously chosen such that the voltage supplied by the circuit is regulated to be close to 5 volts.

When the switch (525) connects the Zener diode (575) and the resistors (563) and (567) to the circuit's negative terminal (590), then the voltage regulating sub-circuit including the four resistors (571, 563, 566 & 567), the Zener diode (575) and the two transistors (561) and (562), is deactivated and the PNP transistor (520) is turned off. In that case the voltage supplied by the circuit is the voltage supplied by each of the two batteries (540 & 550) minus the voltage drop over each of the diodes (510 & 530).

In one embodiment the switch (525) may be included in decision logic (529) that is adapted to decide whether the circuit should supply the higher or the lower supply voltage. In one embodiment the decision logic (529) may include an FPGA (field-programmable gate array). In another embodiment the decision logic (529) may include an ASIC (application specific integrated circuit). In yet another embodiment decision logic (529) may include a microprocessor or microcontroller. In one embodiment the decision logic (529) receives its power supply by it being connected directly or indirectly to the circuit's positive and negative terminals (580) and (590).

Figure 6:
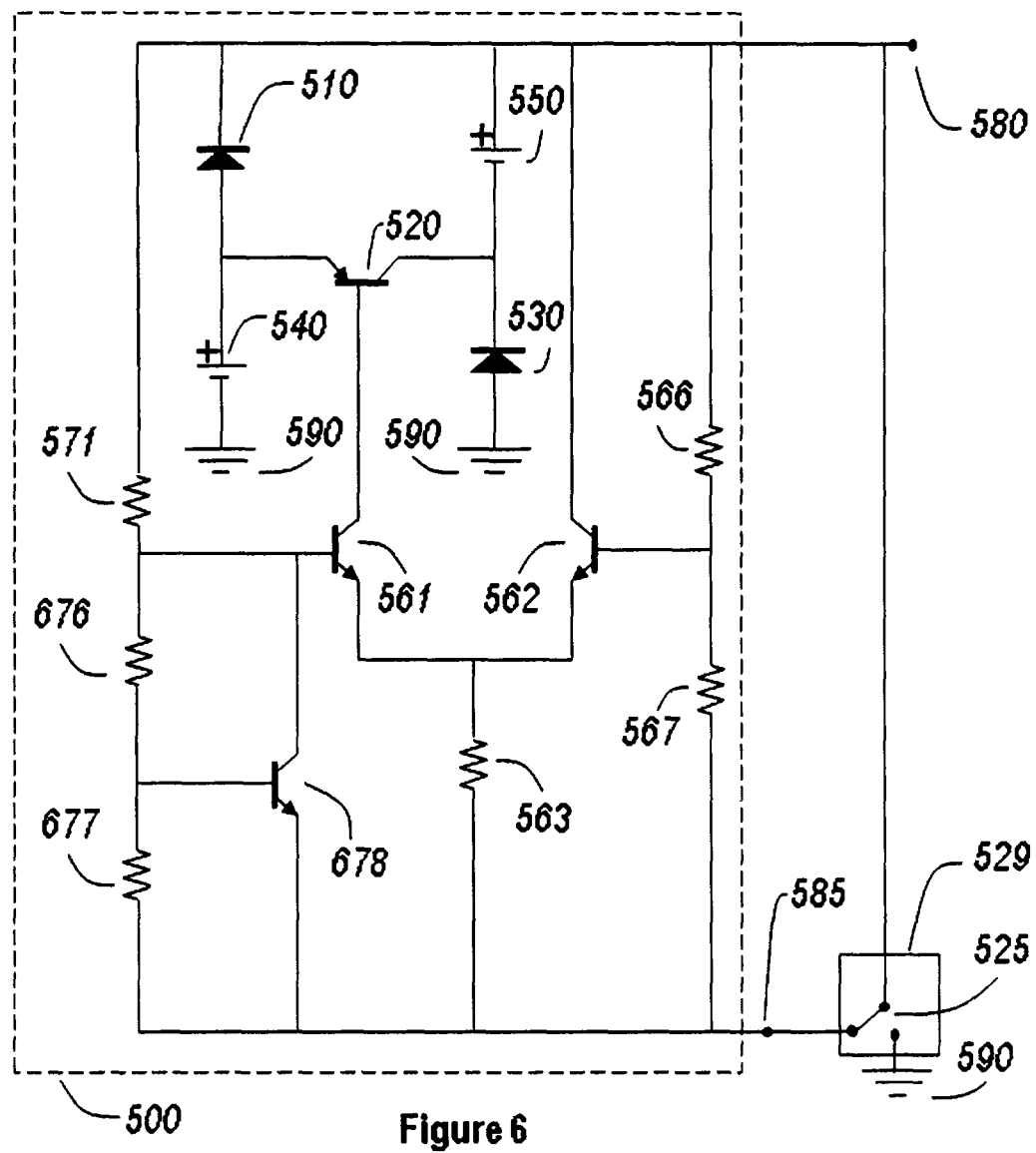
FIG. 6 illustrates a variant of the electronic circuit of FIG. 5.

FIG. 6 illustrates a variant of the electronic circuit of FIG. 5. Components of the circuit of FIG. 6 that correspond to components of FIG. 5 have been given the same numbers. In the circuit of FIG. 6 the Zener diode (575) of the circuit of FIG. 5 has been replaced by a sub-circuit including the resistors (676) and (677) and the transistor (678). The collector of the transistor (678) is connected to the base of the transistor (561). The emitter of transistor (678) is connected to the same terminal of switch (525) that is also connected to resistors (563) and (567). One terminal of the resistor (676) is connected to the collector of the transistor (678) and the other terminal is connected to the base of that same transistor. One terminal of the resistor (677) is connected to the emitter of the transistor (678) (and hence connects it to switch (525)) and the other terminal is connected to the base of that same transistor. Together the resistors (676) and (677) and the transistor (678) supply a reference voltage to the base of the transistor (561).

It will be apparent to a person skilled in the art that the circuits described above can be improved upon e.g. by adding extra components to enhance the stability of the voltage regulation.

Figure 7:
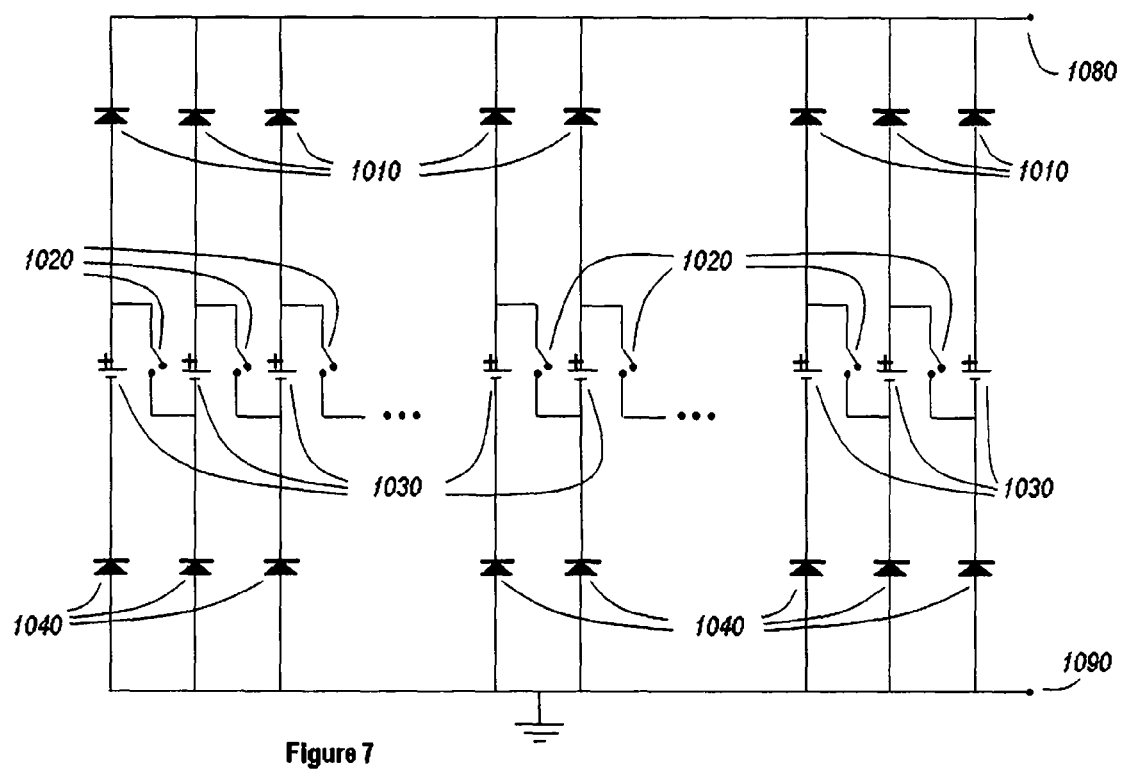
FIG. 7 illustrates an electronic circuit according to one more embodiment of the invention.

FIG. 7 illustrates an electronic circuit according to one more embodiment of the invention. With N being a positive integer number greater than one, this circuit includes a set of N electrical power sources (1030), a set of N−1 electronic switches (1020), a first set of N one-way conductors (1040) and a second set of N one-way conductors (1010). The components are interconnected so as to form N branches, each branch including the series connection of a first one-way conductor (1040) of the first set of one-way conductors (1040), an electrical power source (1030) and a second one-way conductor (1010) of the second set of one-way conductors (1010), wherein the first one-way conductor (1040) connects the negative terminal of the electrical power source (1030) to the negative terminal (1090) of the circuit such that it allows current to flow from the negative terminal (1090) of the circuit to the electrical power source (1030) but that it blocks any significant current in the opposite direction, and wherein the second one-way conductor (1010) connects the positive terminal of the electrical power source (1030) to the positive terminal (1080) of the circuit such that it allows current to flow from the electrical power source (1030) to the positive terminal (1080) of the circuit but that it blocks any significant current in the opposite direction. The N branches are furthermore ordered wherein the positive terminal of the electrical power source (1030) of each branch (except the last branch) is connected by means of one of the N−1 switches (1020) to the negative terminal of the electrical power source of the next branch.

In a typical embodiment one or more of the one-way conductors (1010 & 1040) include a diode. In another typical embodiment one or more of the electrical power sources (1030) include a DC voltage source such as a battery or a photovoltaic voltage source or a fuel cell or a charged capacitor. In yet another typical embodiment one or more of the switches (1020) include a transistor.

FIG. 7 illustrates a particular state of this circuit in which all switches (1020) are open. In this state the circuit is equivalent to a circuit including a parallel connection of N branches, each branch including a series connection of a one-way conductor of the first set of one-way conductors (1040), an electrical power source (1030), and a one-way conductor of the second set of one-way conductors (1010). In one embodiment all electrical power sources are voltage sources with (approximately) the same current-voltage characteristics and all one-way conductors have (approximately) the same current-voltage characteristics. In that case the circuit in the state of FIG. 7 supplies a voltage equal to the voltage supplied by a single voltage source minus the voltage drop over two one-way conductors. The load current is balanced over all voltage sources.

Figure 8:
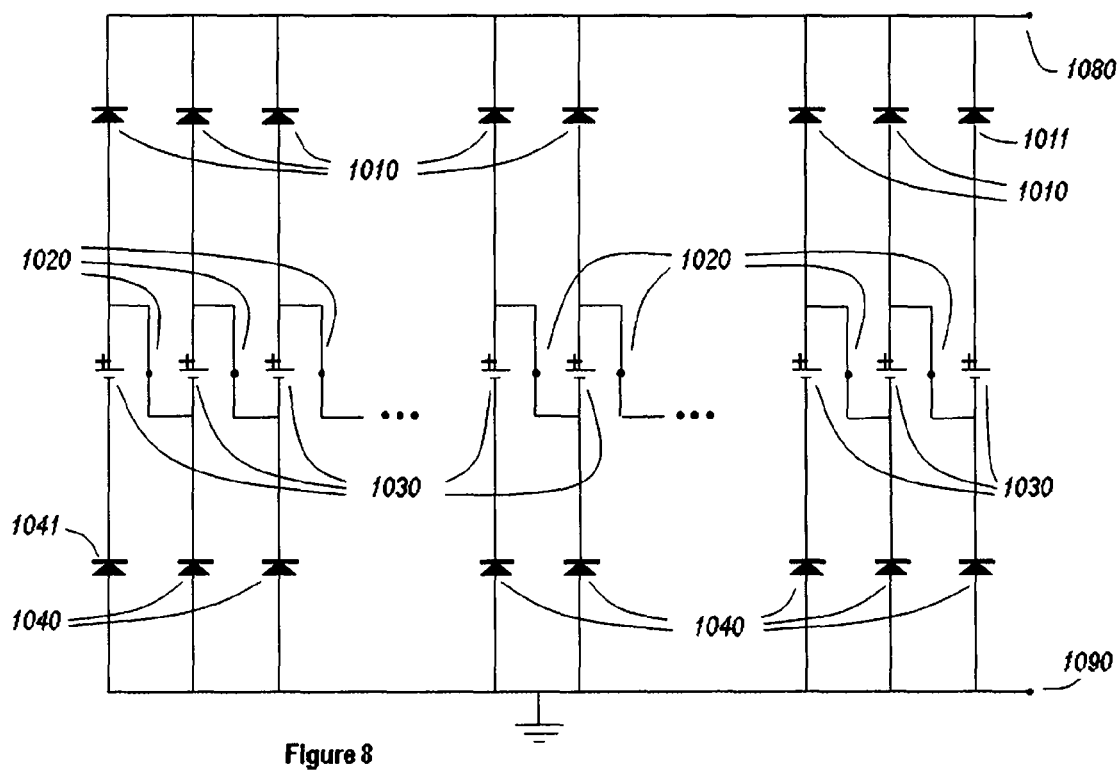
FIG. 8 illustrates the electronic circuit as FIG. 7 in a particular state.

FIG. 8 illustrates another particular state of the circuit of FIG. 7 in which all switches (1020) are closed. In this state the circuit is equivalent to a series connection of the first branch's one-way conductor (1041) of the first set of one-way conductors, the N electrical power sources (1030), the N−1 closed switches (1020), and the last branch's one-way conductor (1011) of the second set of one-way conductors. In that case the circuit in the state of FIG. 8 supplies a voltage equal to the sum of the voltages supplied by the N voltage sources minus the voltage drop over the N−1 switches minus the voltage drops over the first branch's one-way conductor (1041) of the first set of one-way conductors and the last branch's one-way conductor (1011) of the second set of one-way conductors.

Figure 9:
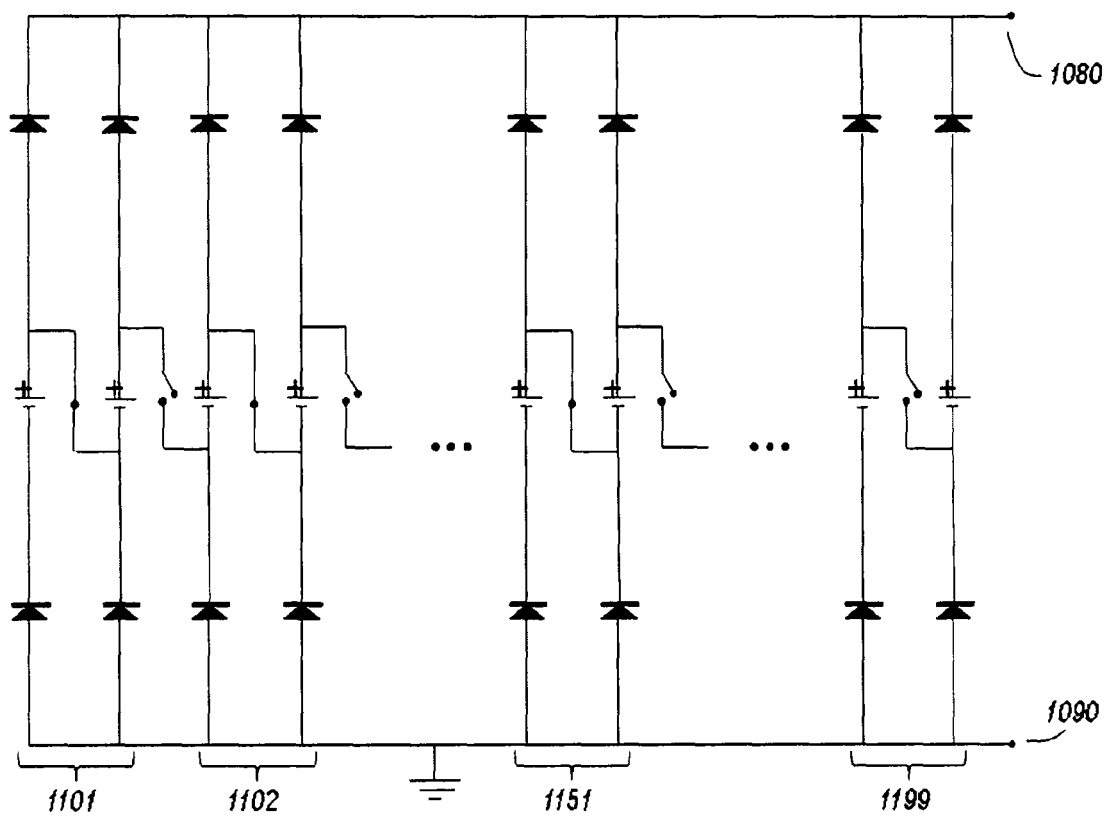
FIG. 9 illustrates the electronic circuit as FIG. 7 in another particular state.

FIG. 9 illustrates yet another particular state of the circuit of FIG. 7. In this state some of the switches are closed while others are open. A number of sub-circuits can be discerned that each consist of subsequent branches that are connected by closed switches and wherein the sub-circuits are defined such that if two branches are connected by a closed switch then both branches belong to the same sub-circuit and if two branches are connected by an open switch then one branch is the last branch of one sub-circuit and the other branch is the first branch of the next sub-circuit. In the particular example of FIG. 9 four sub-circuits (1101, 1102, 1151 & 1199) have been illustrated each consisting of two subsequent branches that are connected by a closed switch. Each sub-circuit is equivalent to a series connection of the one-way conductor of the first set of one-way conductors (1040) of the first branch of that sub-circuit, all the electrical power sources of that sub-circuit, all the closed switches of that sub-circuit, and the one-way conductor of the second set of one-way conductors (1010) of the last branch of that sub-circuit. The full circuit is equivalent to the parallel connection of all these sub-circuits.

In one embodiment the electrical power sources (1030) are voltage sources and each sub-circuit supplies a voltage that is equal to the sum of the voltages supplied by all the voltage sources of that sub-circuit minus the voltage drops over all the closed switches of that sub-circuit minus the voltage drops over that sub-circuit's first branch's one-way conductor of the first set of one-way conductors and that sub-circuit's last branch's one-way conductor of the second set of one-way conductors. By judiciously choosing which switches to open and which to close, one can make the circuit supply any of a variety of voltages.

In one embodiment all electrical power sources are voltage sources with (approximately) the same current-voltage characteristics and all one-way conductors have (approximately) the same current-voltage characteristics and all closed switches have (approximately) the same current-voltage characteristics. If the switches are configured such that the sub-circuits as defined above all include the same number of branches then each sub-circuit will (approximately) supply the same voltage and the load current will be balanced over the voltage sources. The number of different voltages that can thus be supplied by the circuit while achieving a balanced load of the voltage sources depends on the number N of branches and more specifically its factorization.

Figure 10:
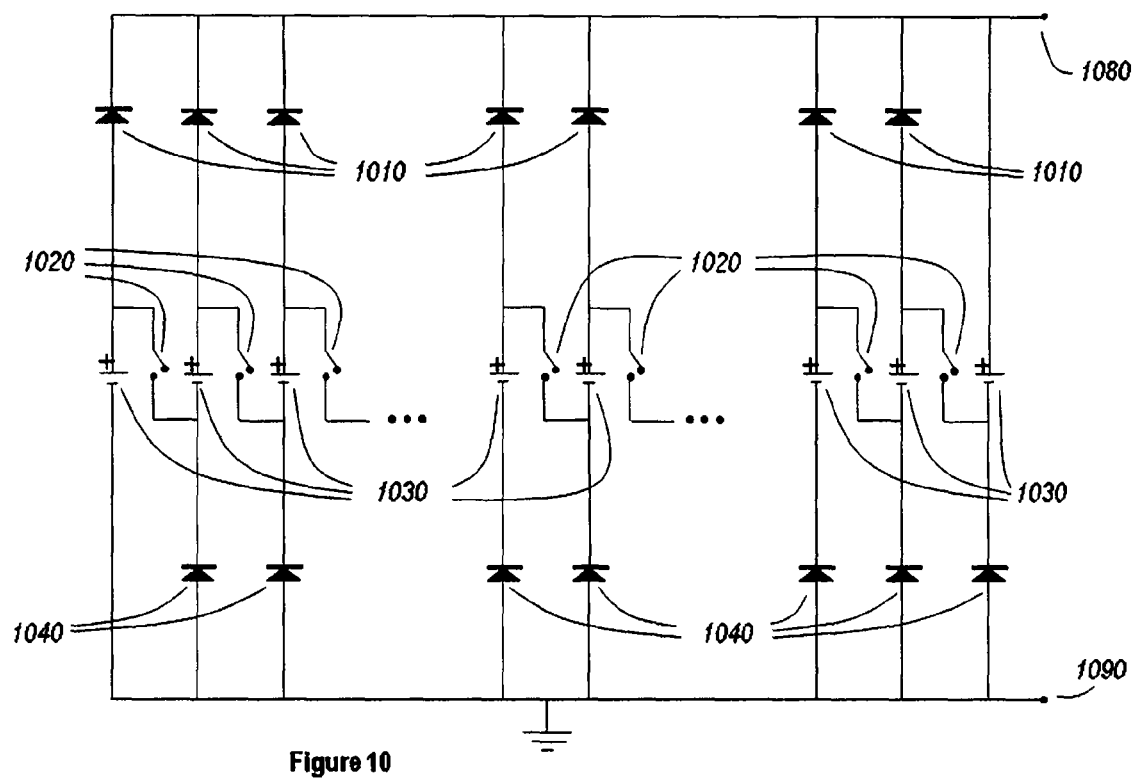
FIG. 10 illustrates a variant of the electronic circuit of FIG. 7.

FIG. 10 illustrates a variant of the electronic circuits of FIGS. 7, 8, 9. With respect to the embodiment of FIGS. 7, 8, 9, in the embodiment of FIG. 10 the one-way conductor (1041) of the first set of one-way conductors (1040) of the first branch of the circuit and the one-way conductor (1011) of the second set of one-way conductors (1010) of the last branch of the circuit have been replaced by two-way conductive connections. In one embodiment these two-way conductive connections may include a resistive component.

It will be apparent for a person skilled in the art that the embodiments illustrated in FIGS. 7, 8, 9 and 10 may be further enhanced with extra components and/or sub-circuits for example to stabilize the voltage that the circuit supplies e.g. similarly to the enhancements to the circuit of FIG. 1 illustrated in FIGS. 4, 5 and 6.

Figure 11:
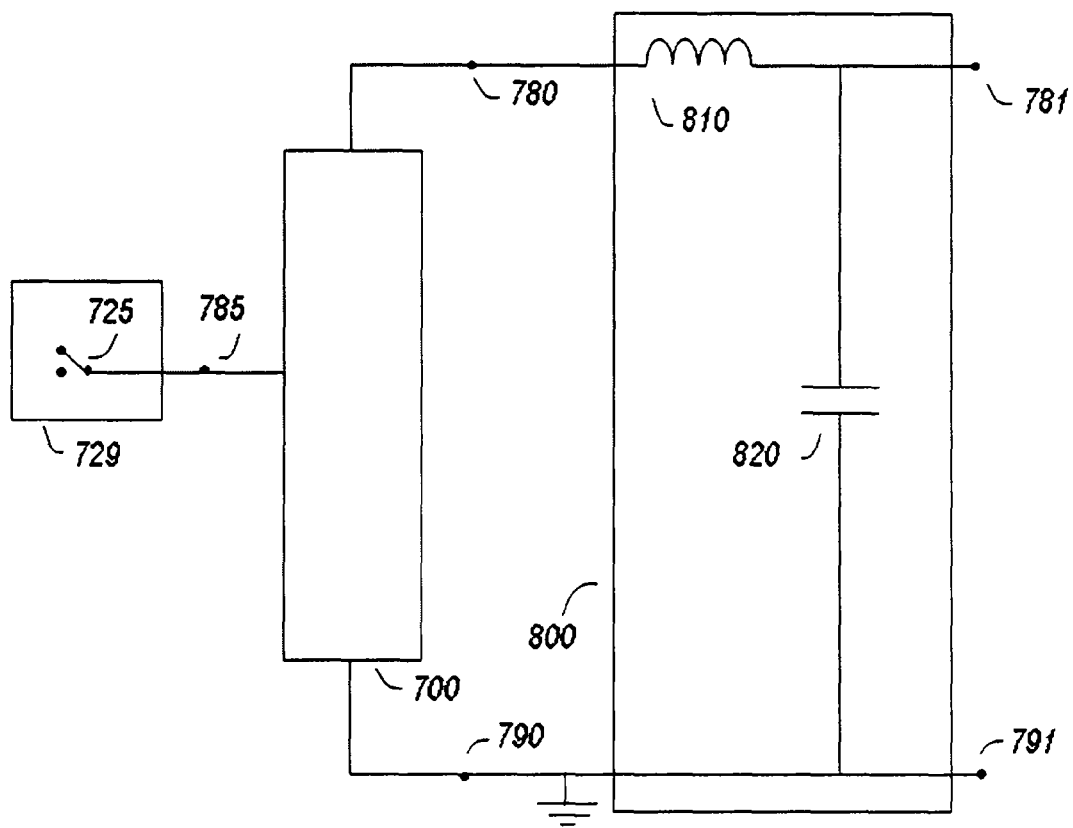
FIG. 11 illustrates an electronic circuit according to still one more embodiment of the invention.

FIG. 11 illustrates an electronic circuit according to still one more embodiment of the invention. The electronic circuit includes a power-supplying circuit (700) according to the invention such as one of the power-supplying circuits described above. In one set of embodiments it may include one of the power-supplying circuits of FIGS. 1, 3 (sub-circuit 300), 4 (sub-circuit 400), 5 (sub-circuit 500), 6 (sub-circuit 500), 7, 8, 9, or 10. The power-supplying sub-circuit (700) includes one or more terminals (785) which may be used to control the state of one or more switches included in power-supplying sub-circuit (700). In a particular set of embodiments the one or more terminals (785) can be used to control the state of the switches (1020) of one of the power-supplying circuits of FIG. 7, 8, 9, or 10. The power-supplying sub-circuit (700) is adapted to act as a voltage source capable of supplying two or more different voltages. In that case the one or more terminals (785) can be used to control which voltage is to be supplied by sub-circuit (700). The circuit furthermore includes a control component (729) which is connected to the one or more control terminals (785) of the power-supplying sub-circuit (700). The control logic (729) switches (more or less regularly) at a relatively high frequency the state of the power-supplying sub-circuit (700) so that the latter supplies alternately a high voltage and a lower voltage. The circuit may furthermore include a low-pass filter (800) which is connected to the positive (780) and negative (790) terminals of the power-supplying sub-circuit (700). The low-pass filter (800) suppresses the high-frequency components of the voltage supplied by the power-supplying sub-circuit (700). The resulting voltage at the output terminals (781 & 791) of the circuit is a DC voltage with a ripple. The value of the DC voltage is determined by the relative fractions of time that the control logic (729) switches the power-supplying sub-circuit (700) to supply the high respectively the lower voltage. The DC voltage can thus be given any voltage between the high and the lower voltage. The amplitude of the ripple is determined by the frequency by which the control logic (729) switches the power-supplying sub-circuit (700) and the characteristics of the low-pass filter (800) and the load (not illustrated) connected to the circuit's terminals (781 & 791).

In a typical embodiment the amplitude of the ripple will be smaller the higher the frequency at which the power-supplying sub-circuit is switched between the high and the lower-voltage. In some embodiments a certain loss of electrical energy will be incurred during each switch and the total loss will be smaller the lower the frequency at which the power-supplying sub-circuit is switched between the high and the lower-voltage.

In some embodiments the components that make up the low-pass filter are chosen to minimize the amplitude of the AC ripple while keeping the costs of the components acceptable. In other embodiments the components that make up the low-pass filter are chosen to minimize the costs of the components while keeping the amplitude of the AC ripple acceptable. In some embodiments the frequency at which the power supply circuit switches between supplying one voltage and another is judiciously chosen so as to keep the amplitude of the AC ripple within acceptable bounds while minimizing the losses associated with the switching. In other embodiments the switching frequency is judiciously chosen so as to minimize the amplitude of the AC ripple while keeping the losses associated with the switching within acceptable bounds.

In one set of embodiments the low-pass filter (800) includes the series connection of an inductor (810) and a capacitor (820) wherein one terminal of the inductor (810) is connected to the positive terminal (780) of the power-supplying sub-circuit (700) and another terminal of the inductor (810) is connected to the positive terminal of the capacitor (820) which is also the positive output terminal (781) and the negative terminal of the capacitor (820) is connected to the negative terminal (790) of the power-supplying sub-circuit (700) which is also the negative output terminal (791).

Figure 12:
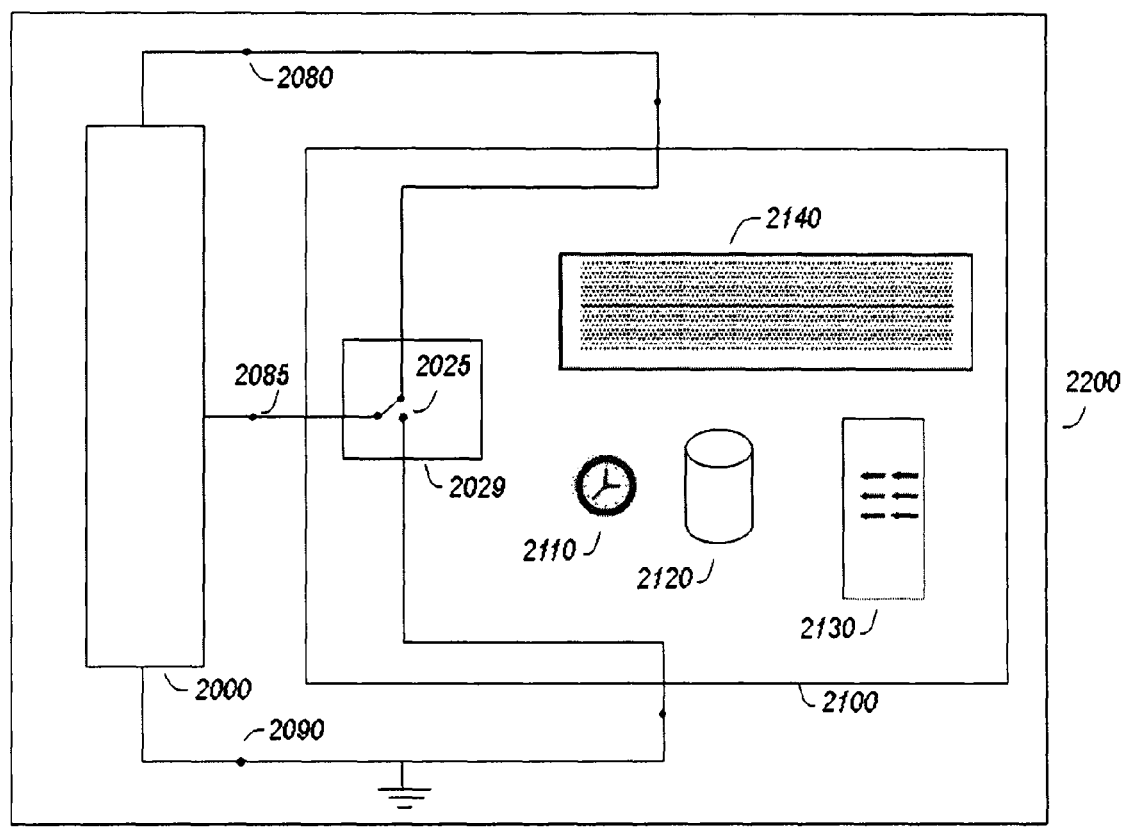
FIG. 12 illustrates an electronic device according to an embodiment of the invention.

FIG. 12 illustrates an electronic device (2200) according to an embodiment of the invention. It includes an electronic circuit that includes a power-supplying sub-circuit (2000) and a set (2100) of various electronic components that are connected to the positive (2080) and negative (2090) terminals of the power-supplying sub-circuit (2000). In some embodiments the power-supplying sub-circuit (2000) includes a configurable electronic power supply sub-circuit capable of being switched to supply at least two different supply voltages, a high supply voltage and a lower supply voltage. In some embodiments the power-supplying sub-circuit (2000) includes a power-supplying circuit according to the invention such as one of the power-supplying circuits described above. In one set of embodiments it may include one of the power-supplying circuits of FIGS. 1, 3 (sub-circuit 300), 4 (sub-circuit 400), 5 (sub-circuit 500), 6 (sub-circuit 500), 7, 8, 9, 10, or 11 (the combination of sub-circuits 700 and 800). In another embodiment the power-supplying sub-circuit (2000) includes one or more terminals (2085) which may be used to control the state of one or more switches included in power-supplying sub-circuit (2000). In a particular set of embodiments the one or more terminals (2085) can be used to control the state of the switches (1020) of one of the power-supplying circuits of FIG. 7, 8, 9, or 10. In yet another embodiment the power-supplying sub-circuit (2000) is adapted to act as a voltage source capable of supplying two or more different voltages. In that case the one or more terminals (2085) can be used to control which voltage is to be supplied by sub-circuit (2000). In some embodiments the power-supplying sub-circuit (2000) includes a sub-circuit to stabilize or regulate one or more of the voltages that the power-supplying sub-circuit (2000) can supply. In another particular set of embodiments the control terminal (2085) corresponds to one of the control terminals (385), (485) or (585) of respectively the power-supplying circuits (300), (400) and (500) of the corresponding FIGS. 3, 4, and 5 and 6.

The set (2100) of various electronic components includes decision logic (2029) adapted to decide which state the power-supplying sub-circuit (2000) is required to be in. In some embodiments the decision logic (2029) is connected to the one or more terminals (2085) of the power-supplying sub-circuit (2000) to control the latter's state. In some particular embodiments the decision logic (2029) is connected to the one or more terminals (2085) of the power-supplying sub-circuit (2000) to control the state of one or more switches included by the latter. In other embodiments the power-supplying sub-circuit (2000) is adapted to act as a voltage source capable of supplying two or more different voltages and the decision logic (2029) is connected to the one or more terminals (2085) of power-supplying sub-circuit (2000) to select the voltage that the power-supplying sub-circuit (2000) must supply. In still other embodiments the decision logic (2029) includes a switch (2025). In some embodiments the switch (2025) has a similar function as the switch (325) in the circuit of FIG. 3 or the switch (425) in the circuit of FIG. 4 or the switches (525) in the circuits of FIG. 5 or 6. In some embodiments the decision logic (2029) has a similar function as the decision logic (529) in the circuits of FIG. 5 or 6.

In some embodiments the decision logic (2029) may include a microprocessor or a microcontroller. In other embodiments the decision logic (2029) may include a field-programmable gate array (FPGA) or an application specific integrated circuit (ASIC).

The set (2100) of various electronic components may also include components that require a continuous power supply in all modes of operation of the device but that can function with more than one supply voltage or supply current. In some embodiments these components may include a RAM memory (2120) and/or a real-time clock (2110).

The set (2100) of various electronic components may furthermore include components that require a particular supply voltage in some modes of operation. In some embodiments these components may include an electronic communication interface (2130) and/or an output component (2140). In one set of embodiments the electronic communication interface (2130) may include a smart card reader. In some embodiments the smart card reader (2130) may have to be supplied in some modes of operation with 5 volts. In another set of embodiments the output component (2140) may include a display such as a liquid crystal display (LCD). In some embodiments the display (2140) requires a supply voltage of 5 volts for optimal readability.

The set (2100) of various electronic components may include still other components (which may not have been illustrated in FIG. 11) such as input means for inputting data which may include a keyboard, or means for optical communication, or a biometric device which may include a fingerprint reader, or additional output means which may include acoustical output means such as a loudspeaker four outputting sounds which may include synthesized speech, or processing means which may include programmable processing means such as a microprocessor or microcontroller which may perform various data processing and/or control functions, or one or more memory components for storing data which may include ROM or EEPROM memory or a (preferably small) disk drive.

In some embodiments the electronic device (2200) includes a portable electronic device such as a cell phone or a smart phone or an MP3 player.

In other embodiments the electronic device (2200) includes a strong authentication token. In one embodiment the strong authentication token includes a display (2140) which may require 5 volts for optimal readability. It may include a RAM memory (2120) for storing data such as one or more secret keys or cryptographic secrets and/or PIN values and/or configuration parameters and/or counter values. It may also include a microprocessor or microcontroller (2025) which is adapted to perform cryptographic algorithms e.g. to generate dynamic passwords or one-time passwords, perform challenge-response functions and/or generate electronic signatures. In some embodiments it may also include a real-time clock (2120) which may be used to generate time-based one-time passwords. In some embodiments it may also include a smart card reader (2130) to communicate with a smart card. The smart card reader (2130) may require a supply voltage of 5 volts for correct functioning. In a particular embodiment the smart card reader (2130) communicates with a financial smart card (like a debit or credit smart card) e.g. for generating one-time passwords and/or electronic signatures.

The strong authentication token may be capable of operating in different modes. In some modes it may require a particular voltage supply and the decision logic (2029) steers the power supply circuit (2000) accordingly so that the correct voltage is supplied. In other modes the requirements with respect to the supply voltage are less specific and the decision logic (2029) steers the power supply circuit (2000) so that it supplies electrical power while efficiently using the electrical power sources that it includes.

In one embodiment the strong authentication token's power supply circuit (2000) is capable of supplying at least two different supply voltages: a (relatively) low supply voltage (e.g. 2.6 volts) and a (relatively) high supply voltage (e.g. 5 volts). In one embodiment the power supply circuit (2000) includes two voltage sources (e.g. batteries) of the same type that nominally supply for example 3 volts, two one-way conductors which may include a diode, and a switch which may include a transistor, all of which are interconnected according to the invention as explained above in relation to the FIGS. 1, 3, 4, 5 and 6, and wherein the control terminal (2085) of the power supply circuit (2000) permits to control the state of the switch. The token's power supply circuit (2000) may for example include the power supply circuit of FIGS. 3 (sub-circuit 300), 4 (sub-circuit 400), 5 (sub-circuit 500) or 6 (sub-circuit 500). The token includes a microprocessor (2029) which is connected to the control terminal (2085) of the power supply circuit (2000). The token also includes one or more components that require in some of the token's operational modes the high supply voltage. These high voltage components may include a display (2140) that requires the high voltage for optimal readability or (optionally) a smart card reader (2130) that requires the high voltage to communicate with an inserted smart card. The token furthermore includes one or more components that require a continuous power supply but that can operate under a wide range of supply voltages which includes the range of voltages between the low supply voltage and the high supply voltage. These low voltage components may for example include a RAM memory (2120) that stores certain data (such as secret keys or PIN values or counter values or configuration parameters) in a non-volatile manner and that can operate with a supply voltage of for example between 2.5 and 5.5 volts. It may also include a real-time clock (2110) that must continuously be powered with a supply voltage between for example 2.5 and 5.5 volts. When the token needs to output data on the display (2140) or needs to communicate with a smart card, it needs the high supply voltage; otherwise the low supply voltage is sufficient. In high-voltage modes where the token requires the high supply voltage, the token's microprocessor (2029) switches the power supply circuit (2000) to supply the higher supply voltage (of for example 5 volts). In low-voltage modes where the high supply voltage is not required the token's microprocessor (2029) switches the power supply circuit (2000) to supply the lower supply voltage so as to use the batteries as efficiently as possible. In a particular embodiment the token's microprocessor (2029) includes a switch (2025) which can connect the control terminal (2085) of the power supply circuit (2000) to the positive (2080) or negative (2090) terminal of the power supply circuit (2000) thereby controlling the state of the switch in the power supply circuit (2000) and selecting the low or high supply voltage.

Figure 13:
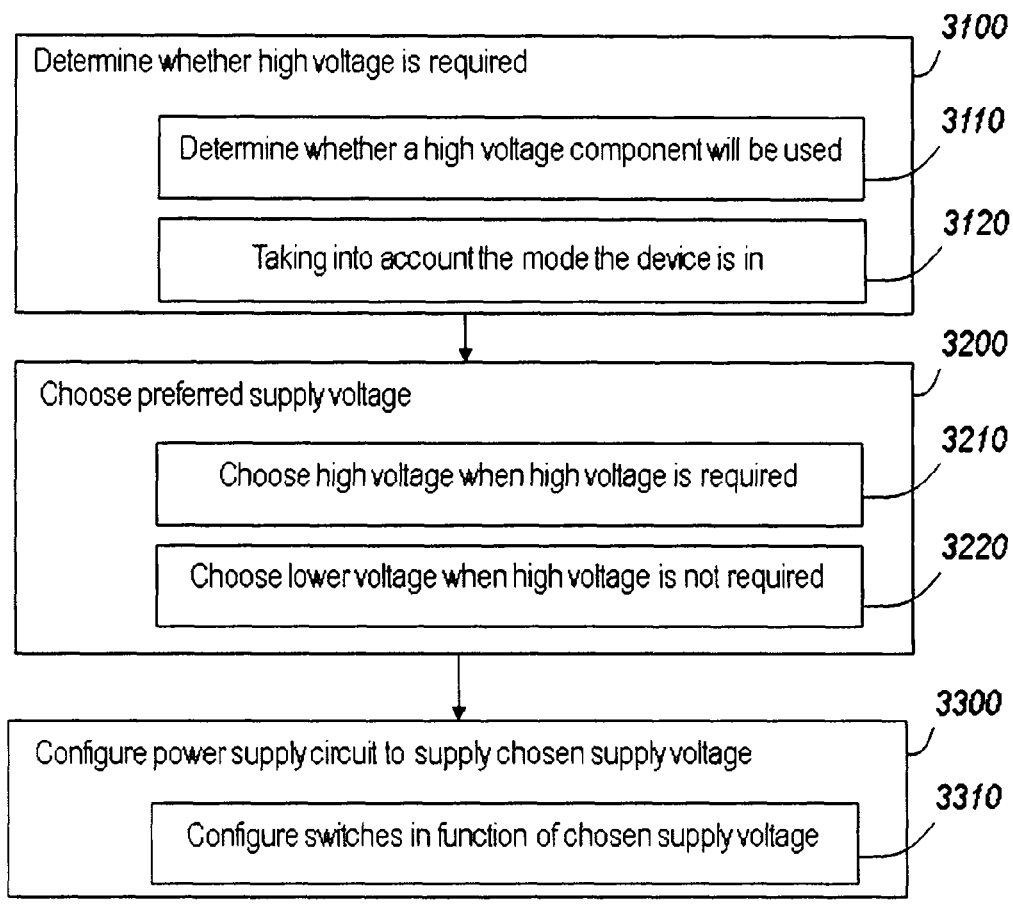
FIG. 13 illustrates a method according to an embodiment of the invention.

FIG. 13 illustrates a method according to the invention for handling the power management of an electronic device that includes an electronic power supply circuit capable of being switched to supply at least two different supply voltages, a high supply voltage and a lower supply voltage, wherein the electronic device in some modes of operation requires the high supply voltage and in other modes of operation can operate with both supply voltages. In some embodiments the electronic device includes one of the embodiments of the electronic device described in connection to FIG. 12. In a particular embodiment the electronic device includes a strong authentication token. In a typical embodiment the method comprises the steps of:

Determining (3100) whether the high supply voltage is required,
Choosing (3200) which supply voltage is preferred,
Configuring (3300) the device's electronic power supply circuit to supply the chosen preferred voltage.

In some embodiments the electronic device can be in different operational modes whereby in some modes the high voltage may be required and in other modes the high voltage is not required and the step of determining whether the high voltage is required or whether the electronic device can operate with the lower voltage includes taking into account (3110) which mode the device is in.

In some embodiments the electronic device includes components that require the high supply voltage when activated, and determining (3100) whether the high supply voltage is required includes determining (3120) for a particular operational mode whether one of the components of the electronic device that requires the high supply voltage when activated will be used.

In other embodiments choosing (3200) the preferred supply voltage includes choosing (3210) the high voltage in modes where the high supply voltage is required. In still other embodiments choosing the preferred supply voltage includes choosing (3220) the low voltage in modes where the high supply voltage is not required.

In still other embodiments the electronic power supply circuit includes a number of electrical power sources and a configuration sub-circuit that includes switches, the state of which determines how the electrical power sources are interconnected; and the step of configuring (3300) the electronic power supply circuit to supply the preferred supply voltage includes appropriately setting (3310) the state of switches of the configuration sub-circuit as a function of the required supply voltage. In some embodiments the electronic power supply circuit includes one of the power supply circuits described in connection to FIG. 1 or FIGS. 3 to 11.

While various embodiments of the present invention have been described above, it should be understood that they have been presented by way of example only, and not limitation. Thus, the breadth and scope of the present invention should not be limited by any of the above described exemplary embodiments but should be defined only in accordance with the following claims and their equivalents.

The invention claimed is:

1. A portable handheld strong authentication token having multiple modes of operation, the token comprising:
   an electronic power supplying circuit capable of supplying at least a first voltage level and a second voltage level that is less than said first voltage level, the first and second voltage levels not equal to zero, the electronic power supplying circuit comprising:
      a positive terminal;
      a negative terminal;
      an ordered plurality of electrical power sources including a first power source and a last power source, each source having a negative pole and a positive pole, the negative pole of the first power source coupled to the negative terminal and the positive pole of the last power source coupled to the positive terminal;
      a first set of at least one one-way conductors, each conductor having an anode and a cathode, the cathode connected to the positive terminal;
      a second set of at least one one-way conductors, each conductor having an anode and a cathode, the anode connected to the negative terminal; and
      a set of at least one electronic switches, each switch having a first terminal and a second terminal;
      wherein:
         the positive pole of each of the plurality of electrical power sources, except the last power source, is connected to the anode of a corresponding one-way conductor of the first set of at least one one-way conductors;
         the negative pole of each of the plurality of electrical power sources, except the first power source, is connected to the cathode of a corresponding one-way conductor of the second set of at least one one-way conductors; and
         the positive pole of each of the plurality electrical power sources, except the last power source, is connected to the first terminal of a corresponding one of said plurality of electronic switches and the second terminal of the corresponding one of said plurality of electronic switches is connected to the negative pole of a next electrical power source of the ordered plurality of electrical power sources, wherein each of said electronic switches permits current flow between the first and second terminals of the switch when closed and prohibits current flow between the first and second terminals of the switch when open;
   said token further comprising:
      a first set of components requiring at least in some modes of operation of said token said first voltage level to function,
      a second set of components capable of functioning with both said first and said second voltage levels, and
      a control sub-circuit adapted to control the voltage level supplied by said electronic power supplying circuit;
   said control sub-circuit further adapted
      to determine whether said token is in a mode of operation in which at least one of said components of said first set of components requires said first voltage level electrical power supply, and
      to control said electronic power supplying circuit to supply said first voltage level when said token is in the determined mode of operation in which at least one of said components of said first set of components requires said first voltage level of electrical power supply, and
      to control said electronic power supplying circuit to supply said second voltage level of electrical power supply at least when said token is in one of some other modes of operation in which no components of said first set of components require said first voltage level.

2. The token of claim 1, wherein the plurality of electrical power sources consists of the first power source and the last power source.

3. The token of either claim 1 or claim 2 wherein the electronic power supplying circuit further comprises a sub-circuit adapted to control the state of said plurality of electronic switches of said electronic power supplying circuit to repeatedly switch said electronic power supplying circuit back and forth between supplying one voltage level for a first period of time and supplying another voltage level for a second period of time wherein an average voltage level is supplied based on a ratio of the first period of time to the second period of time.

4. The token of either claim 1 or claim 2 wherein said first set of components comprises at least a display or a smart card reader.

5. The token of either claim 1 or claim 2 wherein said second set of components comprises at least a real-time clock or a RAM memory.

6. The token of either claim 1 or claim 2, wherein the negative pole of the first power source is coupled to the negative terminal via a first additional one-way conductor and the positive pole of the last power source is coupled to the positive terminal via a second additional one-way conductor.

7. The token of either claim 1 or claim 2, further comprising a control sub-circuit adapted to actuate the appropriate plurality of electronic switches as a function of a desired supply voltage.

8. The token of either claim 1 or claim 2, wherein the electronic power supplying circuit further comprises a low-pass filter adapted to suppress a high frequency ripple on the supplied level.

9. The token of either claim 1 or claim 2, wherein each of said one-way conductors comprise a diode.

10. The token of either claim 1 or claim 2, wherein each of said plurality of electronic switches comprises a PNP transistor having an emitter connected to the positive pole of one of said plurality of electrical power sources and a collector connected to the negative pole of another of said plurality of electrical power sources.

11. The token of either claim 1 or claim 2, wherein each of said plurality of electrical power sources comprises a DC voltage source.

12. The token of either claim 1 or claim 2 adapted to generate dynamic passwords or electronic signatures and further comprising a memory adapted to store secret data and a microprocessor adapted to perform cryptographic algorithms to generate said dynamic passwords or electronic signatures.

13. The token of claim 1 or claim 2, further comprising at least one other one-way conductor for coupling at least one of the negative pole of the first power source to the negative terminal or the positive pole of the last power source to the positive terminal.

14. The token of claim 2, wherein the set of at least one electronic switches comprises a first electronic switch and wherein the conductivity of said first electronic switch can be regulated and wherein said electronic power supplying circuit further comprises a voltage regulating sub-circuit connected to said electronic switch and adapted to regulate, when activated, the conductivity of said first electronic switch such that the voltage supplied by said electronic power supplying circuit has a desired value.

15. The token of claim 14 wherein said voltage regulating sub-circuit comprises a voltage reference sub-circuit, a voltage feedback sub-circuit and a voltage comparing sub-circuit connected to said first electronic switch whereby, when said voltage regulating sub-circuit is activated:
   said voltage reference sub-circuit is adapted to supply a reference voltage to said voltage comparing sub-circuit;
   said voltage feedback sub-circuit is adapted to supply a feedback voltage to said voltage comparing sub-circuit; wherein said feedback voltage is indicative of the value of the voltage supplied by said electronic power supplying circuit;
   said voltage comparing sub-circuit is adapted to compare said reference voltage and said feedback voltage and is furthermore adapted to regulate the conductivity of said first electronic switch so as to reduce the difference between said reference voltage and said feedback voltage.

* * * * *